(12) United States Patent
Yamauchi et al.

(10) Patent No.: US 12,332,655 B2
(45) Date of Patent: Jun. 17, 2025

(54) WORK MANAGEMENT DEVICE AND WORK MANAGEMENT METHOD

(71) Applicant: HONDA MOTOR CO., LTD., Tokyo (JP)

(72) Inventors: Ken Yamauchi, Wako (JP); Hideaki Shimamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 17/955,574

(22) Filed: Sep. 29, 2022

(65) Prior Publication Data

US 2024/0111299 A1   Apr. 4, 2024

(51) Int. Cl.
G05D 1/00 (2024.01)

(52) U.S. Cl.
CPC ......... G05D 1/0287 (2013.01); G05D 1/0246 (2013.01)

(58) Field of Classification Search
CPC .. G05D 1/0287; G05D 1/0246; G05D 1/2435; G05D 2105/15; G05D 2107/23; G05D 2109/10; G05D 2111/10; G05D 2111/64; G05D 1/249; G05D 1/6482; G05D 1/6987; G05D 1/0027; G05D 1/0225; G05D 1/0291; G06Q 10/0631; B25J 5/007; B25J 9/162; B25J 9/163; B25J 9/1661; B25J 9/1664; B25J 9/1666; B25J 11/008; B25J 11/0085; A47L 2201/00; A47L 2201/02; A47L 2201/022; A47L 2201/04; A47L 2201/06; A01D 34/008; G05B 2219/39065; G05B 2219/39078; G05B 2219/40478; G05B 2219/35141
See application file for complete search history.

(56) References Cited

U.S. PATENT DOCUMENTS

| | | | |
|---|---|---|---|
| 9,904,285 B2 * | 2/2018 | Kuhara | G05D 1/0219 |
| 2011/0295424 A1 * | 12/2011 | Johnson | G05D 1/0265 |
| | | | 700/248 |
| 2015/0148951 A1 * | 5/2015 | Jeon | G05D 1/0274 |
| | | | 901/30 |
| 2018/0073266 A1 * | 3/2018 | Goldenberg | G05D 1/0295 |
| 2020/0329935 A1 * | 10/2020 | Park | A47L 11/4002 |
| 2021/0365044 A1 * | 11/2021 | Xue | A01D 34/008 |
| 2021/0397765 A1 | 12/2021 | Shimamura | |
| 2022/0107648 A1 * | 4/2022 | Ratanaphanyarat | G05D 1/227 |
| 2022/0192453 A1 * | 6/2022 | Mosebach | A47L 11/282 |
| 2023/0072442 A1 * | 3/2023 | Wakayama | G06F 9/4881 |

FOREIGN PATENT DOCUMENTS

WO   2020/095375   5/2020

* cited by examiner

Primary Examiner — Abby Y Lin
Assistant Examiner — Esvinder Singh
(74) Attorney, Agent, or Firm — Amin, Turocy & Watson, LLP

(57) ABSTRACT

In a work management device and a work management method, in the case where the number of autonomous mobile working machines used in performing work has been changed, or in the case where, among a plurality of assigned working regions, a difference that is greater than or equal to a percentage threshold value has occurred in a work completion percentage, which is a ratio of a portion where the work is completed to each of the assigned working regions, resetting of the assigned working regions is carried out.

11 Claims, 20 Drawing Sheets

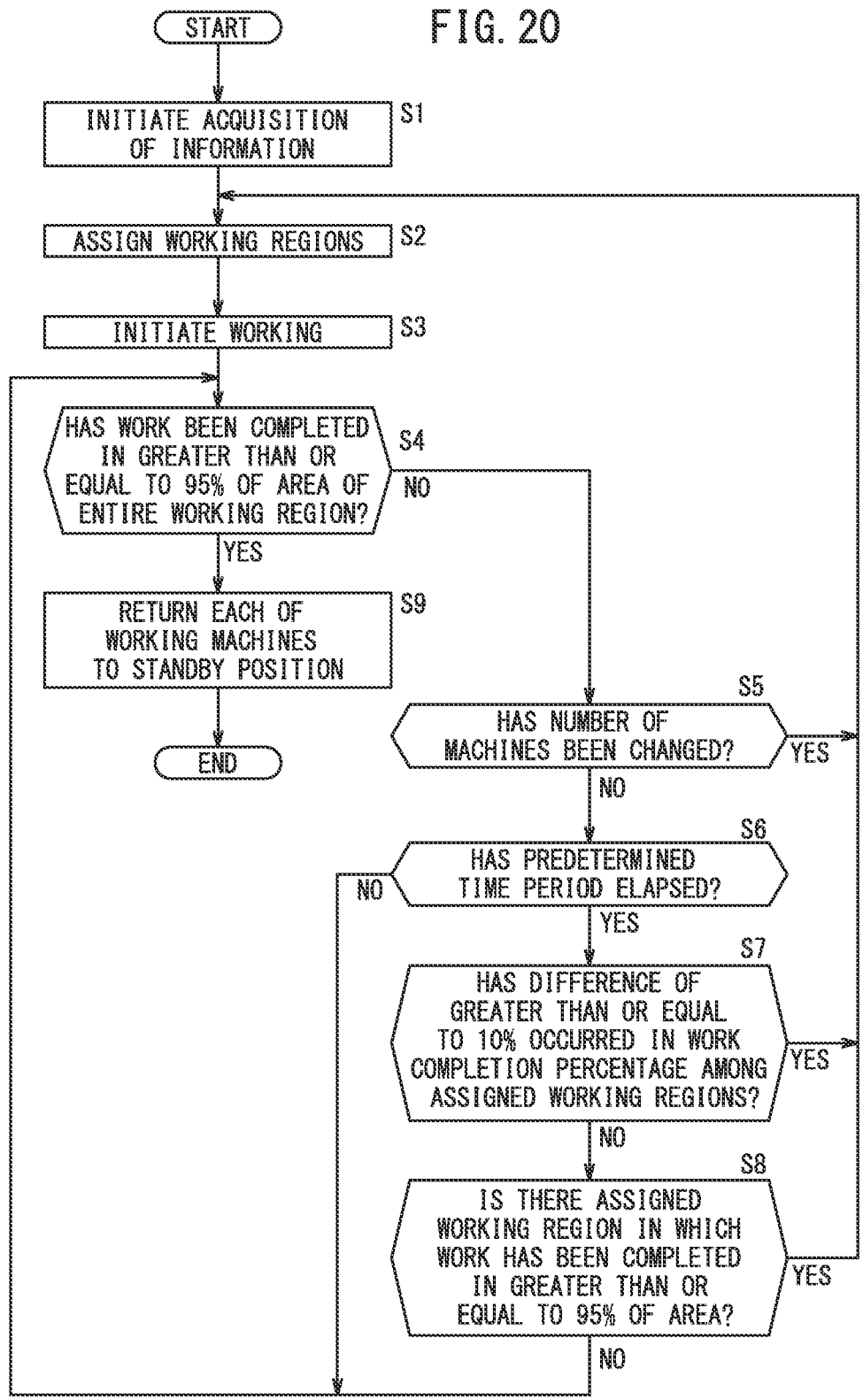

WORK MANAGEMENT DEVICE AND WORK MANAGEMENT METHOD

BACKGROUND OF THE INVENTION

Field of the Invention

The present invention relates to a work management device and a work management method.

Description of the Related Art

In WO 2020/095375 A1 and US 2021/0365044 A1, a work management device is disclosed. The work management device manages work performed in a working region using a plurality of autonomous mobile working machines. Specifically, the work management device divides (sets) one working region into a plurality of working regions assigned to the plurality of autonomous mobile working machines. Each of the plurality of autonomous mobile working machines performs predetermined work in its assigned working region.

SUMMARY OF THE INVENTION

However, in the case that, due to charging or the like of the working machines, a change has occurred in the number of the autonomous mobile working machines used to perform work, then among the plurality of assigned working regions, a variance occurs in the work completion percentage, which is a ratio of a portion where the work is completed to the assigned working region. As a result, there is a possibility that the work completion percentage set for the assigned working regions will not reach the expected work completion percentage. Stated otherwise, the actual work efficiency will not correspond with the expected work efficiency. Further, in the case that the actual situation in the assigned working regions differs from the expected situation, the work efficiency of the autonomous mobile working machines will decrease.

The present invention has the object of solving the aforementioned problems.

A first aspect of the present invention is characterized by a work management device for managing work performed in a working region using a plurality of autonomous mobile working machines, the work management device comprising an information acquisition unit configured to acquire working region information, which is information concerning the working region, and machine number information indicating a number of the autonomous mobile working machines used in performing the work, and a working region assigning unit configured to carry out setting of assigned working regions which are assigned to the plurality of autonomous mobile working machines, based on the working region information and the machine number information acquired by the information acquisition unit, wherein the working region assigning unit carries out resetting of the assigned working regions in a case where the number of the autonomous mobile working machines used in performing the work has been changed, or in a case where, among a plurality of the assigned working regions, a difference that is greater than or equal to a percentage threshold value has occurred in a work completion percentage, which is a ratio of a portion where the work is completed to each of the assigned working regions.

A second aspect of the present invention is characterized by a work management method for managing work performed in a working region using a plurality of autonomous mobile working machines, the work management method comprising an information acquisition step of acquiring working region information, which is information concerning the working region, and machine number information indicating a number of the autonomous mobile working machines used in performing the work, a working region assigning step of carrying out setting of assigned working regions which are assigned to the plurality of autonomous mobile working machines, based on the working region information and the machine number information that have been acquired, and an assigned working region resetting step of carrying out resetting of the assigned working regions in a case where the number of the autonomous mobile working machines used in performing the work has been changed, or in a case where, among a plurality of the assigned working regions, a difference that is greater than or equal to a percentage threshold value has occurred in a work completion percentage, which is a ratio of a portion where the work is completed to each of the assigned working regions.

According to the present invention, in accordance with the working conditions of the plurality of autonomous mobile working machines, resetting of the plurality of assigned working regions is performed. More specifically, in accordance with the working conditions of the plurality of autonomous mobile working machines, a calculation process for optimizing the plurality of assigned working regions is sequentially carried out.

Consequently, the work efficiency is improved, and the work performed in the working region can be completed quickly.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 20 is a flow chart showing operations of the work management system.

DETAILED DESCRIPTION OF THE INVENTION

Figure 1:
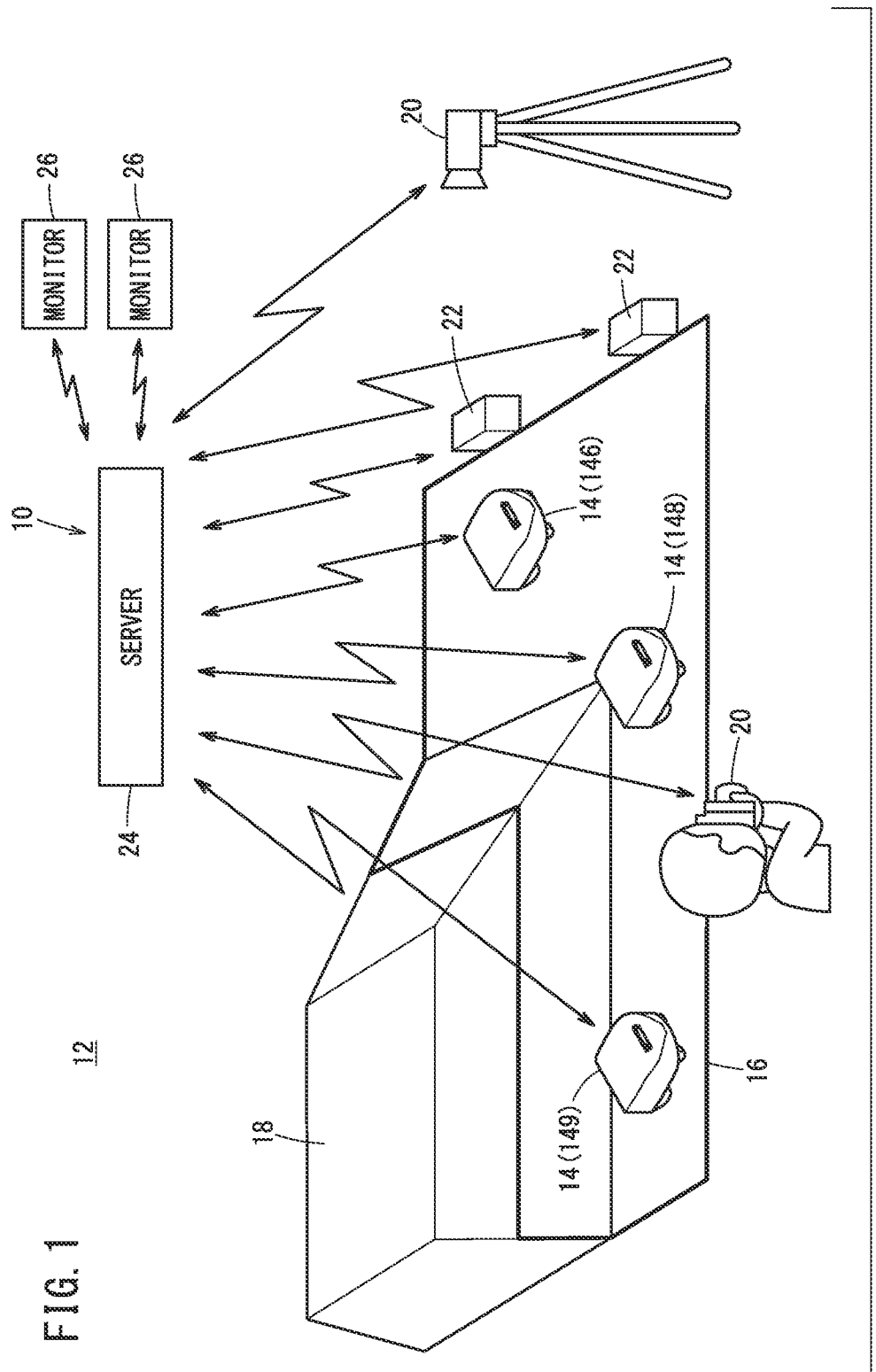
FIG. 1 is a configuration diagram of a work management system including a work management device according to the present embodiment.

FIG. 1 is a configuration diagram of a work management system 12 including a work management device 10 according to the present embodiment.

The work management device 10 manages predetermined work performed in a working region 16 using a plurality of autonomous mobile working machines 14. As shown in FIG. 1, the working region 16 is a portion of a lawn 18. In the working region 16, a flat portion and a sloped portion that is higher than the flat portion are included. The plurality of autonomous mobile working machines 14 perform lawn mowing work in the working region 16 by autonomously traveling in the working region 16. Accordingly, the work management device 10 manages the lawn mowing work performed using the plurality of autonomous mobile working machines 14. In the description that follows, the autonomous mobile working machines 14 will be referred to as working machines 14.

The work management system 12 is equipped with the work management device 10, the plurality of working machines 14, a plurality of cameras 20, and a plurality of charging stations 22. Moreover, in FIG. 1, it should be noted that the plurality of working machines 14, the plurality of cameras 20, and the plurality of charging stations 22 are illustrated in an exaggerated manner.

The plurality of working machines 14 have the same shape and the same configuration. The plurality of working machines 14 are arranged in the working region 16, and perform the lawn mowing work in the working region 16.

The plurality of cameras 20 are arranged outside of the working region 16. The plurality of cameras 20 capture images of the working region 16 and the plurality of working machines 14 that are arranged in the working region 16.

The plurality of charging stations 22 are arranged at the edge of the working region 16. The respective working machines 14 are capable of receiving electrical power supplied from the charging stations 22 by moving to the charging stations 22. More specifically, the working machines 14 are charged at the charging stations 22.

In FIG. 1, an exemplary case is illustrated in which three working machines 14 are arranged in the working region 16, two cameras 20 are arranged outside of the working region 16, and two charging stations 22 are arranged.

The work management device 10 includes a server 24 and a plurality of monitors 26.

The server 24 controls the entire work management system 12. The server 24 is capable of transmitting and receiving signals or information to and from the plurality of working machines 14, the plurality of cameras 20, and the plurality of charging stations 22 by way of wireless communication. Further, the server 24 is capable of transmitting and receiving signals or information to and from the plurality of monitors 26 by way of wireless communication. Moreover, it should be noted that the server 24 may be a cloud server. Alternatively, the server 24 may be a single physical server.

The plurality of monitors 26 have the same shape and the same configuration. The plurality of monitors 26 are installed at a location remote from the working region 16. In FIG. 1, an exemplary case is shown in which two monitors 26 are arranged.

Figure 2:
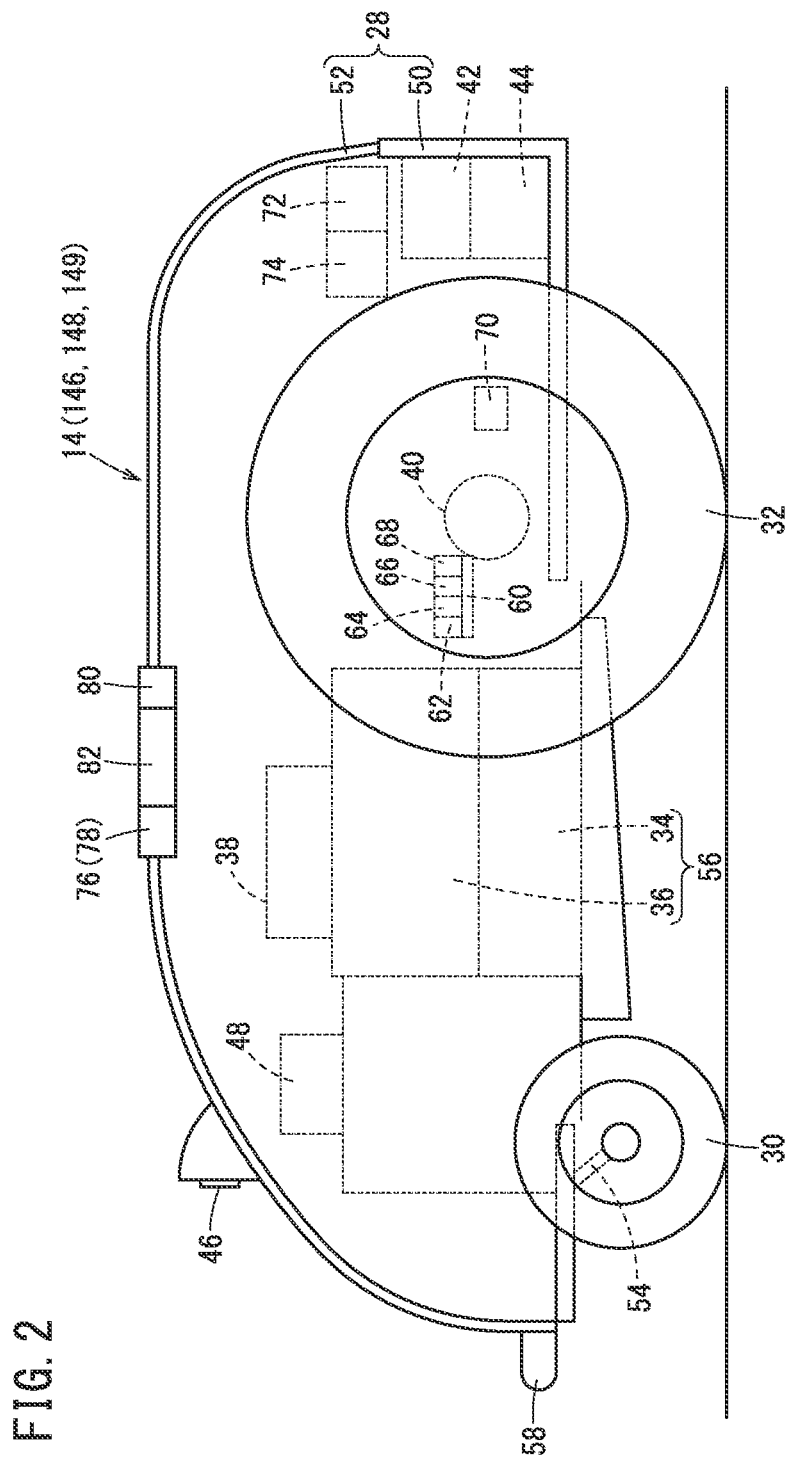
FIG. 2 is a side view of a working machine.
Figure 3:
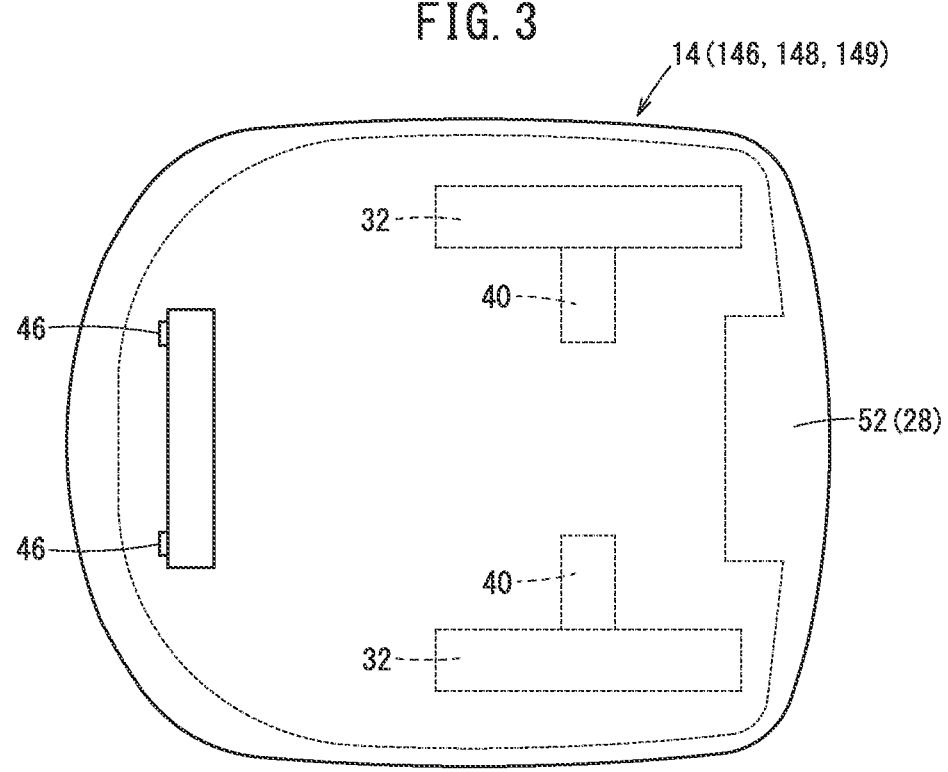
FIG. 3 is a plan view of the working machine.
Figure 4:
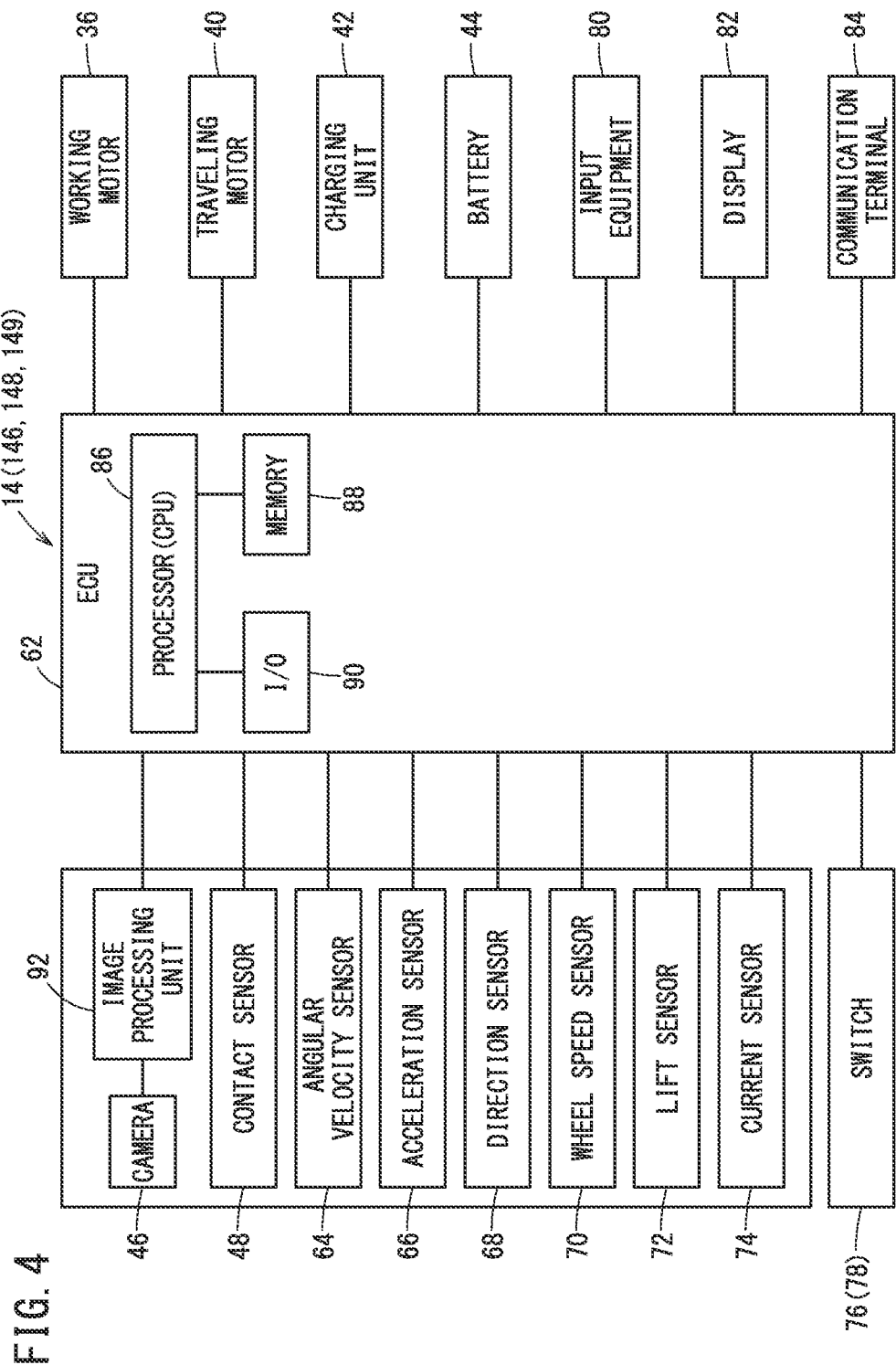
FIG. 4 is a block diagram of the working machine.

FIG. 2 is a side view of the working machine 14. FIG. 3 is a plan view of the working machine 14. FIG. 4 is a block diagram of the working machine 14.

As shown in FIG. 2, the working machine 14 includes a machine body 28, front wheels 30, rear wheels 32, a blade 34, a working motor 36, a blade height adjustment mechanism 38, two traveling motors 40, a charging unit 42, a battery 44, two cameras 46, and a contact sensor 48. The working machine 14 has a weight and dimensions that enable it to be carried by a user. In the description that follows, front and rear, up and down, and left and right directions will be described with a direction in which the working machines 14 move forward as a frontward direction.

The machine body 28 includes a chassis 50 and a frame 52. The frame 52 is attached to the chassis 50 in a manner so as to cover the chassis 50 from above. A pair of left and right front wheels 30 are arranged on a front portion of the chassis 50. The front wheels 30 are rotatably supported by stays 54 that extend from the chassis 50. As shown in FIG. 3, a pair of left and right rear wheels 32 are arranged on a rear portion of the chassis 50. As shown in FIG. 2, the rear wheels 32 have a larger diameter than the front wheels 30. The rear wheels 32 are rotatably supported by the chassis 50.

The blade 34 is arranged in a central portion of the chassis 50. The working motor 36 is arranged above the blade 34. The blade 34 is connected to the working motor 36. The blade 34 is rotated by driving the working motor 36. By rotating the blade 34, the working machines 14 are capable of mowing the grass in the working region 16 (refer to FIG. 1). Accordingly, the blade 34 and the working motor 36 constitute a working unit 56 for carrying out the lawn mowing work. The blade height adjustment mechanism 38 is connected to the blade 34. The blade height adjustment mechanism 38 is capable of adjusting the height position of the blade 34 by a manual operation made by the user. Alternatively, the blade height adjustment mechanism 38 is capable of automatically adjusting the height position of the blade 34.

As shown in FIG. 3, among the two traveling motors 40, one of the traveling motors 40 is connected to the left rear wheel 32. The other of the traveling motors 40 is connected to the right rear wheel 32. The traveling motors 40 cause the rear wheels 32 to rotate forward or backward. By driving the traveling motors 40 and thereby rotating the rear wheels 32, the working machines 14 are capable of traveling within the working region 16 (refer to FIG. 1).

As shown in FIG. 2, the charging unit 42 and the battery 44 are stored in the rear portion of the working machine 14. A pair of charging terminals 58 are provided on the front portion of the frame 52. The charging terminals 58 project out in the frontward direction. The charging terminals 58 are electrically connected to the charging unit 42. The pair of charging terminals 58 are connected to the charging station 22 when the working machine 14 moves to the charging station 22 (refer to FIG. 1). By the pair of charging terminals 58 being connected to the charging station 22, the battery 44 can be charged from the charging station 22 via the charging unit 42. Further, the charging unit 42 supplies the electrical power from the battery 44 to the respective components inside the working machine 14. For example, the charging unit 42 supplies electrical power from the battery 44 to the working motor 36 and the traveling motors 40, thereby driving the working motor 36 and the traveling motors 40.

The two cameras 46 are arranged on a front portion of the working machine 14. As shown in FIG. 3, the two cameras 46 are arranged on the front portion of the frame 52, and are separated by an interval in the left-right direction. The two cameras 20 are arranged so as to be capable of stereoscopically viewing in a frontward direction or peripherally around the working machine 14.

As shown in FIG. 2, at a time when the frame 52 becomes detached from the chassis 50 due to contact between the working machine 14 and an obstacle or foreign matter, the contact sensor 48 outputs a detection result indicating that the frame 52 has become detached from the chassis 50.

The working machine 14 includes a circuit board 60, an ECU (electronic control unit) 62, an angular velocity sensor 64, an acceleration sensor 66, a direction sensor 68, a wheel speed sensor 70, a lift sensor 72, a current sensor 74, a main switch 76, an emergency stop switch 78, input equipment 80, a display 82, and a communication terminal 84 (refer to FIG. 4).

The circuit board 60 is arranged in a central portion of the working machine 14. The ECU 62 is mounted on the circuit board 60. The ECU 62 is made up from a microcomputer. As shown in FIG. 4, the ECU 62 includes a processor 86, a memory 88, and an I/O (input/output circuit) 90.

As shown in FIG. 2, the angular velocity sensor 64, the acceleration sensor 66, and the direction sensor 68 are mounted on the circuit board 60. The angular velocity sensor 64 detects an angular velocity (yaw rate) of a center of gravity position about a vertical axis of the working machine 14. The acceleration sensor 66 detects an acceleration that acts on the working machine 14 in three axial directions (a front-rear direction, an up-down direction, and a left-right direction). The direction sensor 68 detects the absolute direction of the working machine 14 in accordance with geomagnetism.

Moreover, it should be noted that the working machine 14 may further include a GPS sensor (not shown) for detecting the position of the working machine 14. Alternatively, the working machine 14 may specify the position of the working machine 14 using images captured by the two cameras 46 or the like.

The wheel speed sensor 70 is arranged in close proximity to the left and right rear wheels 32. The wheel speed sensor 70 detects the wheel speed of the left and right rear wheels 32. The lift sensor 72 is arranged between the chassis 50 and the frame 52. When the user or the like has lifted (lifted up) the frame 52 from the chassis 50, the lift sensor 72 outputs a detection result indicating that the frame 52 has been lifted up. The current sensor 74 detects the electrical current (consumption current) that flows out from the battery 44.

The main switch 76, the emergency stop switch 78, the input equipment 80, and the display 82 are disposed in an upper part of the frame 52. The main switch 76 is operated by the user, and thereby issues an instruction to the working machine 14 to initiate the operation or the like. The emergency stop switch 78 is operated by the user, and thereby issues an instruction to the working machine 14 to stop in an emergency situation. The input equipment 80 is an input device such as a keyboard or a touch panel for the user to make an operation input. By the user operating the input equipment 80, a command corresponding to the operation input is output from the input equipment 80 to the ECU 62. The display 82 displays various types of information corresponding to commands from the ECU 62.

As shown in FIG. 4, the I/O 90 outputs, to the processor 86, outputs from the various sensors, the cameras 20, and the switches inside the working machine 14. Moreover, the cameras 20 are connected to an image processing unit 92. On the basis of the outputs from the cameras 20, the image processing unit 92 generates images of the working region 16 (refer to FIG. 1) which are captured by the cameras 20. The I/O 90 outputs the images generated by the image processing unit 92 to the processor 86. The processor 86 implements various functions by reading in and executing programs stored in the memory 88. For example, the processor 86 controls each of the components of the working machines 14.

The communication terminal 84 transmits and receives signals or information to and from the server 24 (refer to FIG. 1) by way of wireless communication. The communication terminal 84 is made up from a portable digital assistant (PDA) such as a smart phone equipped with a communication function.

Figure 5:
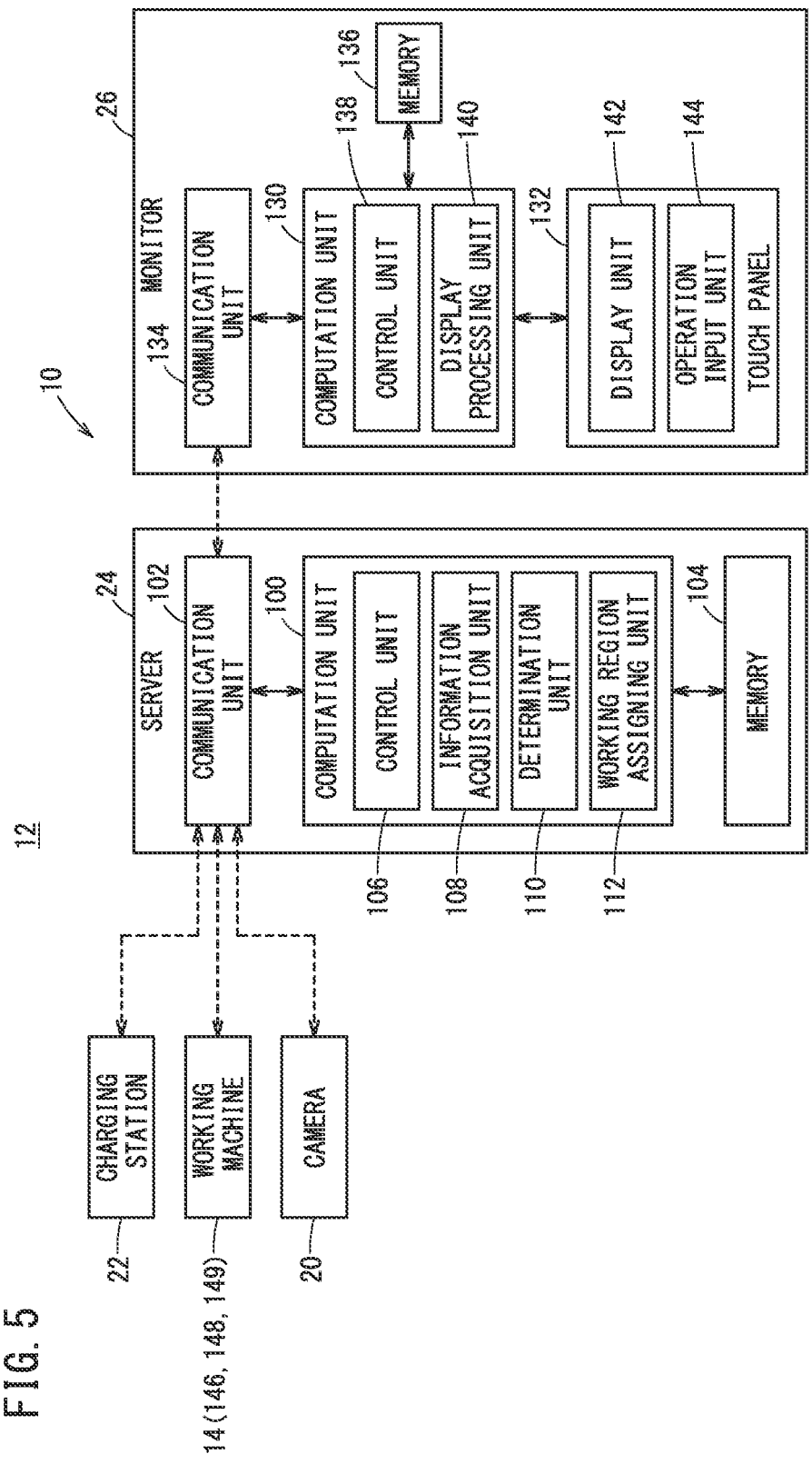
FIG. 5 is a block diagram of the work management system.

FIG. 5 is a block diagram of the work management system 12. As noted previously, the plurality of working machines 14 have the same configuration. The plurality of cameras 20 have substantially the same configuration. The plurality of charging stations 22 have the same configuration. The plurality of monitors 26 have the same configuration. Accordingly, in FIG. 5, one of the working machines 14, one of the charging stations 22, one of the cameras 20, and one of the monitors 26 are shown representatively.

The server 24 includes a computation unit 100, a communication unit 102, and a memory 104.

The communication unit 102 transmits and receives signals or information to and from the charging stations 22, the working machines 14, the cameras 20, and the monitors 26 by way of wireless communication. Respective items of information received from the charging stations 22, the working machines 14, the cameras 20, and the monitors 26 are stored in the memory 104.

By reading out and executing the programs stored in the memory 104, the computation unit 100 implements the functions of a control unit 106, an information acquisition unit 108 (an information acquisition unit, a working machine state information acquisition unit, a travel path information acquisition unit), a determination unit 110 (a number-of-machines determination unit, a work completion percentage determination unit), and a working region assigning unit 112.

The control unit 106 controls the respective components inside the server 24.

The information acquisition unit 108 acquires information from the working machines 14, the cameras 20, the charging stations 22, and the monitors 26 via the communication unit 102.

Further, the information acquisition unit 108 acquires information stored in the memory 104. In this case, the information acquisition unit 108 may acquire various types of information at a predetermined time interval.

Specifically, the memory 104 stores in advance working region information, which is information concerning the working region 16, and machine number information indicating the number of the working machines 14 used in the lawn mowing work. The information acquisition unit 108 acquires the working region information and the machine number information from the memory 104.

Further, the working machines 14 transmit working machine state information indicating the states of the working machines 14, and travel path information indicating travel paths 160 (refer to FIG. 7), which are travel trajectories of the working machines 14, to the server 24 at a predetermined communication period. The information acquisition unit 108 acquires the working machine state information and the travel path information received by the communication unit 102.

In the working machine state information, there is included at least one item of information from among information indicating operating states of the working machines 14, information indicating remaining capacities of the batteries 44 (refer to FIG. 2) provided in the working machines 14, information indicating errors occurring in the working machines 14, information indicating a state of communication between the working machines 14 and the server 24, and information indicating loads of the working units 56 provided in the working machines 14.

The information indicating the operating states of the working machines 14 is the status of the working machines 14. Specifically, the information indicates whether the working machines 14 are in any one of a state of charging, in a state of performing work, or in a stopped state. The information indicating errors occurring in the working machines 14 is information indicating a malfunction or a failure of the working machines 14. For example, such information is information indicating that the working machines 14 are stuck in a depression and cannot move. The information indicating the loads of the working units 56 (refer to FIG. 2) provided in the working machines 14, for example, is information indicating that the blade 34 is in a state of being difficult to rotate due to becoming entangled in the grass.

In the travel path information, there is included information indicating the travel paths 160 (refer to FIG. 7), which are travel trajectories of the working machines 14. As noted previously, the travel path information is information indicating the travel trajectories of the working machines 14. Therefore, the travel path information may be information indicating the positions of the working machines 14 at respective times. In this case, the travel paths 160 are formed by connecting the positions of the working machines 14 at the respective times.

Furthermore, the charging stations 22 may transmit information of the working machines 14 undergoing charging or the like to the server 24 at the predetermined communication period. The information acquisition unit 108 acquires the information received by the communication unit 102. In such information, there is included information indicating that the working machines 14 are undergoing charging, information indicating the remaining capacities of the batteries 44 provided in the working machines 14, and the like.

Further, the cameras 20 transmit captured images of the working region 16 to the server 24 at the predetermined communication period. The information acquisition unit 108 acquires the images received by the communication unit 102.

Furthermore, the communication unit 102 transmits and receives signals or information to and from the monitors 26 at the predetermined communication period. The information acquisition unit 108 acquires the information received by the communication unit 102.

Based on the working region information and the machine number information acquired by the information acquisition unit 108, the working region assigning unit 112 carries out setting of assigned working regions 120 (refer to FIG. 6) which are assigned to the plurality of working machines 14. More specifically, the working region assigning unit 112 divides the one working region 16 into a plurality of assigned working regions 120. In this case, the working region assigning unit 112 sets the plurality of assigned working regions 120 in a manner so that the areas of the plurality of assigned working regions 120 are equivalent to each other. By setting the assigned working regions 120 in this manner, among the plurality of divided assigned working regions 120, each of the plurality of working machines 14 is placed in charge of the work in any one of the assigned working regions 120.

The determination unit 110 carries out various determination processes on the basis of the information acquired by the information acquisition unit 108. Specifically, the determination unit 110 determines whether or not, based on the working machine state information acquired by the information acquisition unit 108, the number of the working machines 14 used in the working region 16 (refer to FIG. 6) has been changed. Further, the determination unit 110 determines whether or not a difference that is greater than or equal to a percentage threshold value has occurred in a work completion percentage, which is a ratio of a portion where the work is completed to the assigned working region 120, among the plurality of assigned working regions 120. It should be noted that the percentage threshold value may be, for example, 10%.

Further, at the time when the plurality of working machines 14 are carrying out work, in the case that a change in the number of the working machines 14 used in performing the work is determined by the determination unit 110, the working region assigning unit 112 resets the assigned working regions 120. Alternatively, at the time when the plurality of working machines 14 are carrying out work, in the case that the determination unit 110 determines that, among the plurality of assigned working regions 120, a difference that is greater than or equal to the percentage threshold value has occurred in the work completion percentage, the working region assigning unit 112 resets the assigned working regions 120. In this case, the working region assigning unit 112 resets the plurality of assigned working regions 120, in a manner so that the areas of the plurality of assigned working regions 120 are equivalent to each other.

Further, in the case that the assigned working regions 120 are reset, concerning a work completed region that is an assigned working region 120 for which the work completion percentage has become greater than or equal to a work completion threshold value, the working region assigning unit 112 excludes such a region from being a target of resetting of the assigned working regions 120. Accordingly, the working region assigning unit 112 resets the assigned working regions 120, concerning the remaining region after having excluded the work completed region from the working region 16. It should be noted that the work completion threshold value may be, for example, 95%.

Further, the aforementioned percentage threshold value is set in the following manner. For example, in the case that the work completion threshold value is 95%, the percentage threshold value may be set to 10%, which is two times the remaining 5%. In this case, among the plurality of assigned working regions 120, if the difference in the work completion percentage lies within 10%, it is possible to suppress a difference in the timing at which the work is completed among the plurality of working machines 14. Among the plurality of assigned working regions 120, if the difference in the work completion percentage exceeds 10%, there is a possibility that a difference may occur in the timing at which the work is completed among the plurality of working machines 14.

The monitors 26 each include a computation unit 130, a touch panel 132, a communication unit 134, and a memory 136.

The communication unit 134 transmits and receives signals or information to and from the communication unit 102 of the server 24 by way of wireless communication.

The computation unit 130, by reading out and executing programs stored in the memory 136, implements the functions of a control unit 138 and a display processing unit 140.

The control unit 138 controls the respective components inside the monitor 26. The display processing unit 140 carries out a display process for displaying the information received by the communication unit 134 on a display unit 142 (information providing unit) of the touch panel 132.

In the information received by the communication unit 134, there is included at least one item of information from among information indicating the assigned working regions 120, and working information, which is information concerning the work of the working machines 14. Further, in the working information, there are included at least one item of information from among work completion portion information indicating a portion of each of the assigned working regions 120 where the work of the working machine 14 has been completed, information indicating loads of the working machines 14, and working machine state information. The information indicating the loads of the working machines 14 is information indicating the loads when the working machines 14 actually perform work in the assigned working regions 120. The information indicating the loads of the working machines 14 corresponds to information indicating the loads of the working units 56 (refer to FIG. 2) provided in the working machines 14.

The touch panel 132 includes the display unit 142 and an operation input unit 144. The display unit 142 is a display screen of the touch panel 132. The operation input unit 144 is an operation device such as an operation button of the touch panel 132 in order for the user to make an operation input.

The display unit 142 displays various types of information based on a display process performed by the display processing unit 140. Consequently, the display unit 142 can provide the user with at least one item of information from among the information indicating the assigned working regions 120, and the working information.

By operating the operation input unit 144 after having confirmed the displayed contents of the display unit 142, the user is capable of selecting at least either the working machines 14 used in performing the work, or the assigned working regions 120 where the work is to be continued. The control unit 138 transmits the selection result of the user to the server 24 via the communication unit 134. The information acquisition unit 108 of the server 24 acquires the selection result received by the communication unit 102. The working region assigning unit 112 resets the assigned working regions 120, based on the selection result acquired by the information acquisition unit 108.

Figure 6:
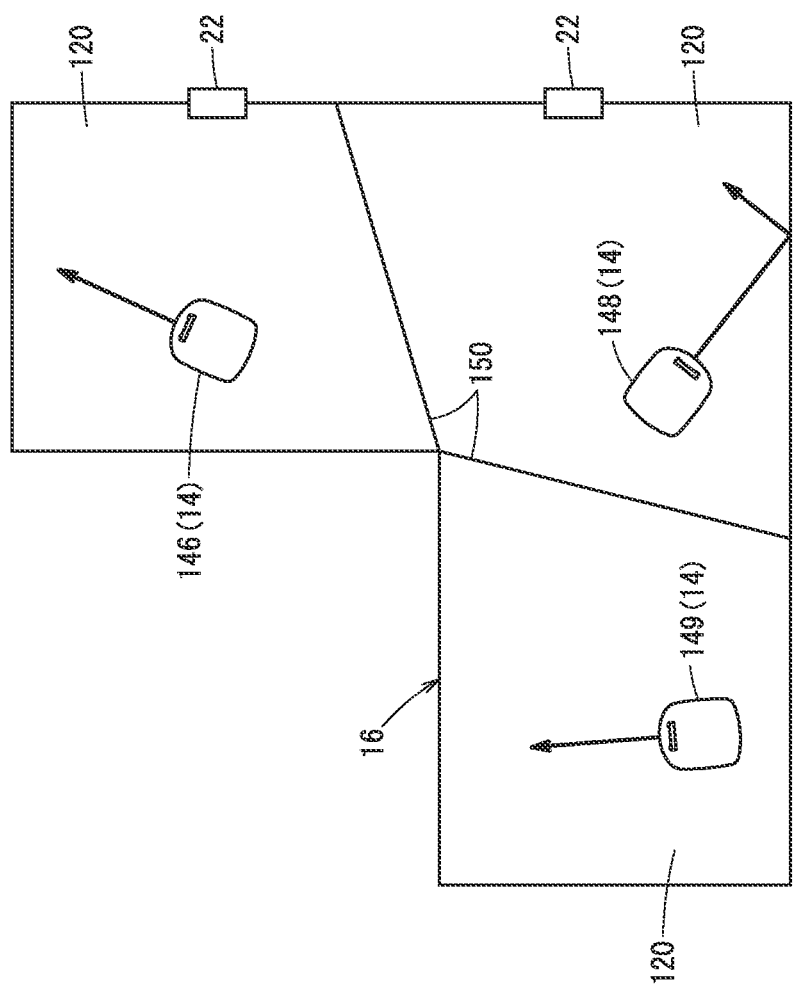
FIG. 6 is a plan view showing a working region.

FIG. 6 is a plan view showing the working region 16. In FIG. 6, an exemplary case is illustrated in which one working region 16 is divided into three assigned working regions 120. Each of the three working machines 14 is placed in charge of any one of the assigned working regions 120. Accordingly, in FIG. 6, one of the working machines 14 carries out the lawn mowing work in one of the assigned working regions 120.

Moreover, in FIG. 6, the solid lines within the working region 16 indicate boundaries 150 between the assigned working regions 120. Further, in the actual working region 16, the boundaries 150 are not drawn with lines such as solid lines. Further, the arrows indicate the moving directions of the working machines 14. Furthermore, in the description that follows, there may be cases in which the three working machines 14 are referred to as a first working machine 146, a second working machine 148, and a third working machine 149.

Figure 7:
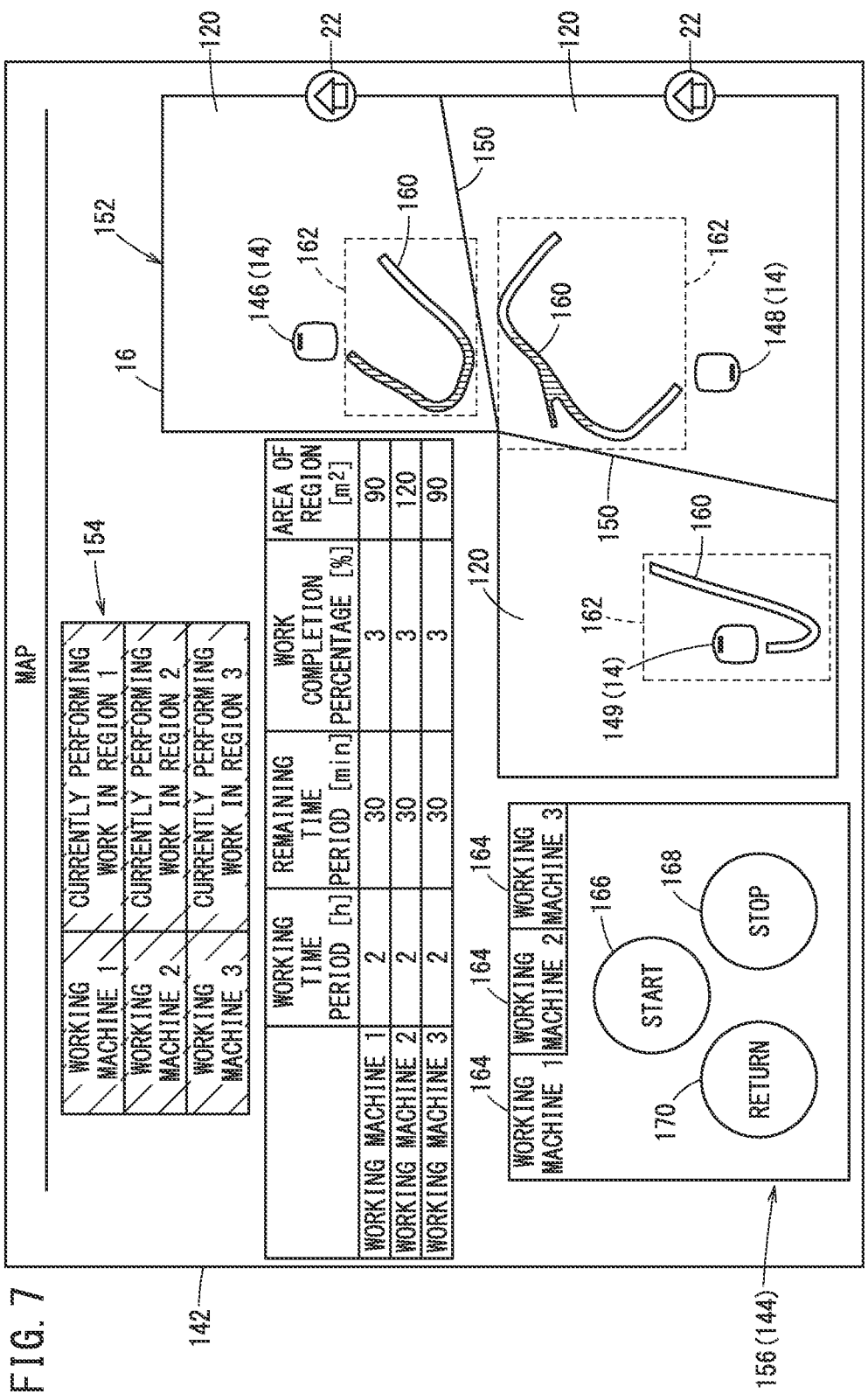
FIG. 7 is a diagram showing the displayed contents of a display unit.

FIG. 7 is a diagram showing the displayed contents of the display unit 142, which is a display screen of the monitor 26 (refer to FIG. 5). A working region image 152 showing the working region 16 is displayed on the right part of the display unit 142. A working information image 154 indicating the working information is displayed on the upper part and the center of the display unit 142. Furthermore, an operation input image 156 showing the operation input unit 144 is displayed on the lower left part of the display unit 142. Moreover, in FIG. 7 and the subsequent figures, there may be cases in which the images of the constituent elements displayed on the display unit 142 are described using the names and reference numerals of the constituent elements.

In the working region image 152, the working region 16, the assigned working regions 120, the positions of the charging stations 22, the positions of the three working machines 14, the travel paths 160 of the three working machines 14, and the boundaries 150 are included. In this case, the boundaries 150 are displayed in the form of solid lines. Further, the travel paths 160 are indicated by thick outline lines, and thick lines with hatching. The thick lines with hatching indicate locations where the loads of the working machines 14 are relatively high.

Moreover, it should be noted that, in the present embodiment, in the working region image 152, the assigned working regions 120 may be displayed in different colors from each other. Alternatively, in the working region image 152, the assigned working regions 120 may be displayed with different brightnesses. In accordance with this feature, the boundaries of the respective assigned working regions 120 serve the same function as that of the boundaries 150.

Further, it should be noted that, in the present embodiment, in the working region image 152, the colors of the respective assigned working regions 120 may be made to correspond to the colors of the working machines 14. Consequently, it becomes easier for the user to understand which of the assigned working regions 120 the working machines 14 are assigned with.

Furthermore, in the present embodiment, the travel paths 160 may be represented by gradations of color or brightness in accordance with the magnitude of the loads of the working machines 14. Alternatively, within the travel paths 160, only locations where a load threshold value set in advance by the user is exceeded may be displayed in varied colors or brightnesses. In accordance with this feature, it is possible to visually inform the user of places where grass grows easily by using such gradations of the colors or brightnesses, or variations in the colors or brightnesses. Further, the gradations of the colors or brightnesses, or alternatively, the variations in the colors or brightnesses, can be provided to the user as reference information for a lawn maintenance operation such as fertilizing or watering. In accordance with this feature, as will be described later, by the user selecting locations where the loads were high in the travel paths 160, it becomes possible to easily reset the assigned working regions 120 where the work is to be performed again. Alternatively, the working region assigning unit 112 becomes capable of automatically resetting, as the assigned working regions 120, the locations where the loads were high.

Moreover, the portions where the work has actually been completed are portions along the travel paths 160. Specifically, by multiplying the total length of the travel paths 160 by the lateral width of the blade 34 (refer to FIG. 2), the area of the portions where the work has actually been completed can be obtained. Further, there is also a possibility that the working machines 14 may pass through the same locations. Therefore, considering a case in which the working machines 14 have passed through the same locations, the area of the portions where the work has been completed can be obtained. Alternatively, a map in which the entire working region 16 is divided into a plurality of segments of a predetermined area may be prepared in advance, and the area of the portions where the work has been completed may be determined from the number of the segments through which the working machines 14 have passed. In FIG. 7, dashed line regions 162 that surround the travel paths 160 are simply shown in a pseudo manner as portions where the work has been completed.

In the working information image 154, the state of each of the working machines 14, a working time period, a remaining time period until the work is completed, the work completion percentage, and the area of the assigned working regions 120 are displayed. Moreover, in FIG. 7, the fact that the three working machines 14 are currently performing work is displayed.

Selection buttons 164 for selecting the working machines 14 are displayed in an upper part of the operation input image 156. A plurality of the selection buttons 164 corresponding to the plurality of working machines 14 are arranged in the upper part of the operation input image 156. When the user presses the selection button 164 of a desired working machine 14, a plurality of buttons for issuing various commands to the selected working machine 14 are displayed. The plurality of buttons are a start button 166, a stop button 168, and a return button 170. When the user presses another selection button 164, the start button 166, the stop button 168, and the return button 170, which correspond to the other selection button 164, are displayed.

When the user presses the start button 166, the control units 138 (refer to FIG. 5) of the monitors 26 transmit, to the server 24, commands for causing the selected working machines 14 to perform work. The control unit 106 of the server 24 transmits the commands received by the communication unit 102 to the working machines 14. The working machines 14 are operated in accordance with the commands received by the communication terminals 84 (refer to FIG. 4). Consequently, the working machines 14 initiate working in the assigned working regions 120.

When the user presses the stop button 168, the control units 138 of the monitors 26 transmit, to the server 24, commands for causing the selected working machines 14 to stop. The control unit 106 of the server 24 transmits the commands received by the communication unit 102 to the working machines 14. The working machines 14 are stopped in accordance with the commands received by the communication terminals 84. Consequently, the working machines 14 stop the work performed in the assigned working regions 120.

When the user presses the return button 170, the control units 138 of the monitors 26 transmit, to the server 24, commands for causing the selected working machines 14 to return to a standby position. The control unit 106 of the server 24 transmits the commands received by the communication unit 102 to the working machines 14. The working machines 14 stop their work upon receiving the commands received by the communication terminals 84. Thereafter, the working machines 14 move to their standby positions.

Moreover, is should be noted that the standby positions are, for example, positions at the charging stations 22.

Next, with reference to FIGS. 6 to 19, a description will be given concerning the work performed in the working region 16 by the plurality of working machines 14. In this instance, a case will be described in which the user remotely operates the plurality of working machines 14 by operating the operation input unit 144 while observing the display unit 142.

First, the information acquisition unit 108 (refer to FIG. 5) of the server 24 acquires the working region information and the machine number information from the memory 104. Based on the working region information and the machine number information acquired by the information acquisition unit 108, the working region assigning unit 112 sets the assigned working regions 120 (refer to FIG. 6). The communication unit 102 of the server 24 transmits, to the monitors 26, information about the assigned working regions 120 and the like that have been set. The display processing unit 140 of each of the monitors 26 causes the information about the assigned working regions 120 and the like received by the communication unit 134 to be displayed on the display unit 142 of the touch panel 132 (refer to FIG. 7).

The user presses any of the selection buttons 164 while observing the display unit 142. As a result, the display unit 142 displays the plurality of buttons in accordance with the working machine 14 corresponding to the selection button 164 pressed by the user. Next, from among the plurality of buttons, the user presses the start button 166. Consequently, the control unit 138 of each of the monitors 26 transmits, to the server 24, a command for causing the working machine 14 corresponding to the start button 166 pressed by the user to be operated. The control unit 106 of the server 24 transmits the command received by the communication unit 102 to the working machine 14. By being operated in accordance with the command received by the communication terminal 84 (refer to FIG. 4), the working machine 14 initiates working in the assigned working region 120.

Further, in a similar manner, the user instructs the other two working machines 14 to initiate working by pressing the start button 166. Consequently, commands are transmitted via the server 24 from the monitors 26 to the two working machines 14. As a result, based on the received commands, the two working machines 14 initiate working in the assigned working regions 120. Moreover, in FIG. 7, on the display unit 142, the fact is displayed that the three working machines 14 are currently performing work in the assigned working regions 120.

The three working machines 14, while carrying out work in their assigned working regions 120, transmit various types of information in relation to their work to the server 24 at the predetermined communication period. The server 24 sequentially transmits the information received from the three working machines 14 to the monitors 26. Consequently, the monitors 26 are capable of displaying, on the display units 142, the information of the three working machines 14 sequentially received from the server 24. More specifically, the displayed contents of the display unit 142 are sequentially updated. Specifically, the positions and the travel paths 160 of the respective working machines 14, and the dashed line regions 162 are sequentially updated. Further, the working time periods, the remaining time periods, the work completion percentages of the respective working machines 14, and the area of the assigned working regions 120 are sequentially updated in the working information image 154.

Figure 8:
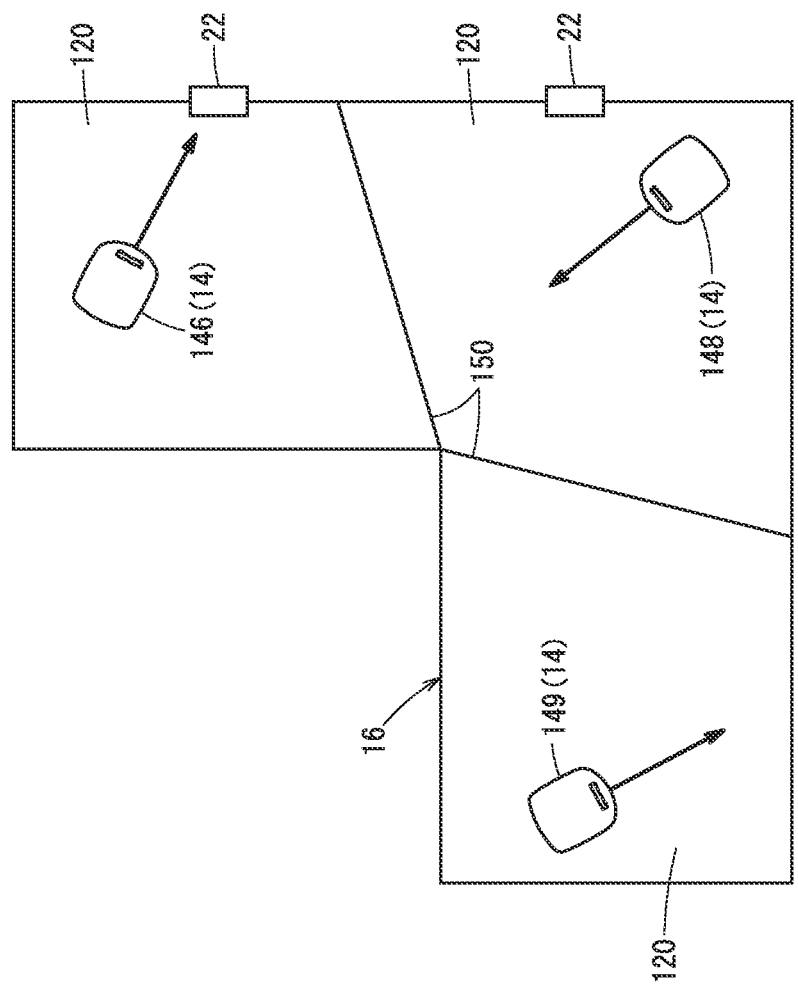
FIG. 8 is a plan view showing the working region.
Figure 9:
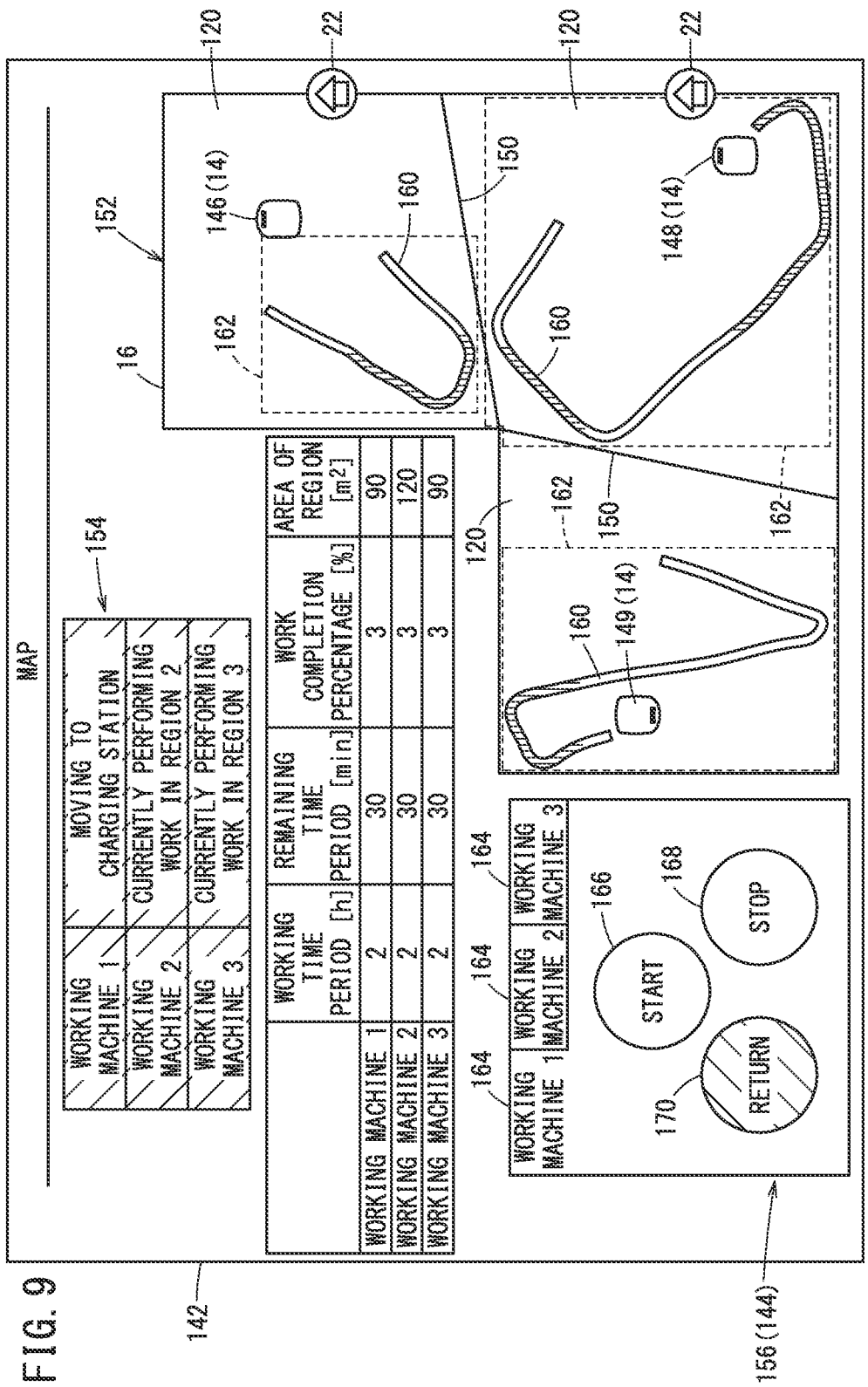
FIG. 9 is a diagram showing the displayed contents of the display unit.

Thereafter, as shown in FIG. 8 and FIG. 9, from among the three working machines 14, the user decides to cause the first working machine 146 to be returned to the charging station 22 and to undergo charging. Next, while observing the display unit 142, the user selects the selection button 164 corresponding to the first working machine 146. Consequently, the plurality of buttons corresponding to the first working machine 146 are displayed on the display unit 142.

Next, from among the plurality of buttons, the user selects the return button 170. Consequently, the display unit 142 performs a display to the effect that the return button 170 has been selected by the user. In FIG. 9, such a display is indicated by hatching. The control unit 138 (refer to FIG. 5) of each of the monitors 26 transmits, to the server 24, a command for causing the first working machine 146 to return to the charging station 22. The control unit 106 of the server 24 transmits the command received by the communication unit 102 to the first working machine 146. The first working machine 146 stops performing work in response to the received command. Then, the first working machine 146 moves to the charging station 22.

As noted previously, various types of information concerning the work are transmitted from each of the working machines 14 to the monitors 26 via the server 24. Therefore, information indicating that the first working machine 146 is moving to the charging station 22 is displayed in the working region image 152 and the working information image 154. Specifically, the display unit 142 displays the working information image 154 indicating that the first working machine 146 is undergoing movement, and the second working machine 148 and the third working machine 149 are currently performing work. Further, since the first working machine 146 has stopped performing work, the position of the first working machine 146 is separated away from the travel path 160 in the working region image 152 (refer to FIG. 9).

Figure 10:
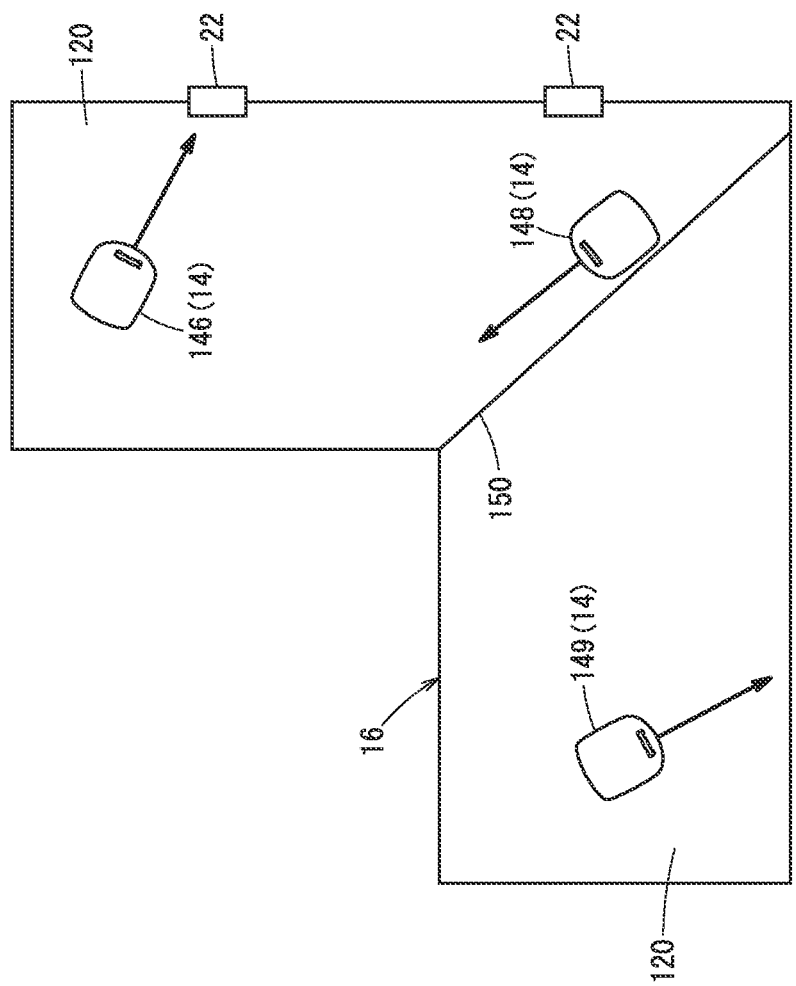
FIG. 10 is a plan view showing the working region.
Figure 11:
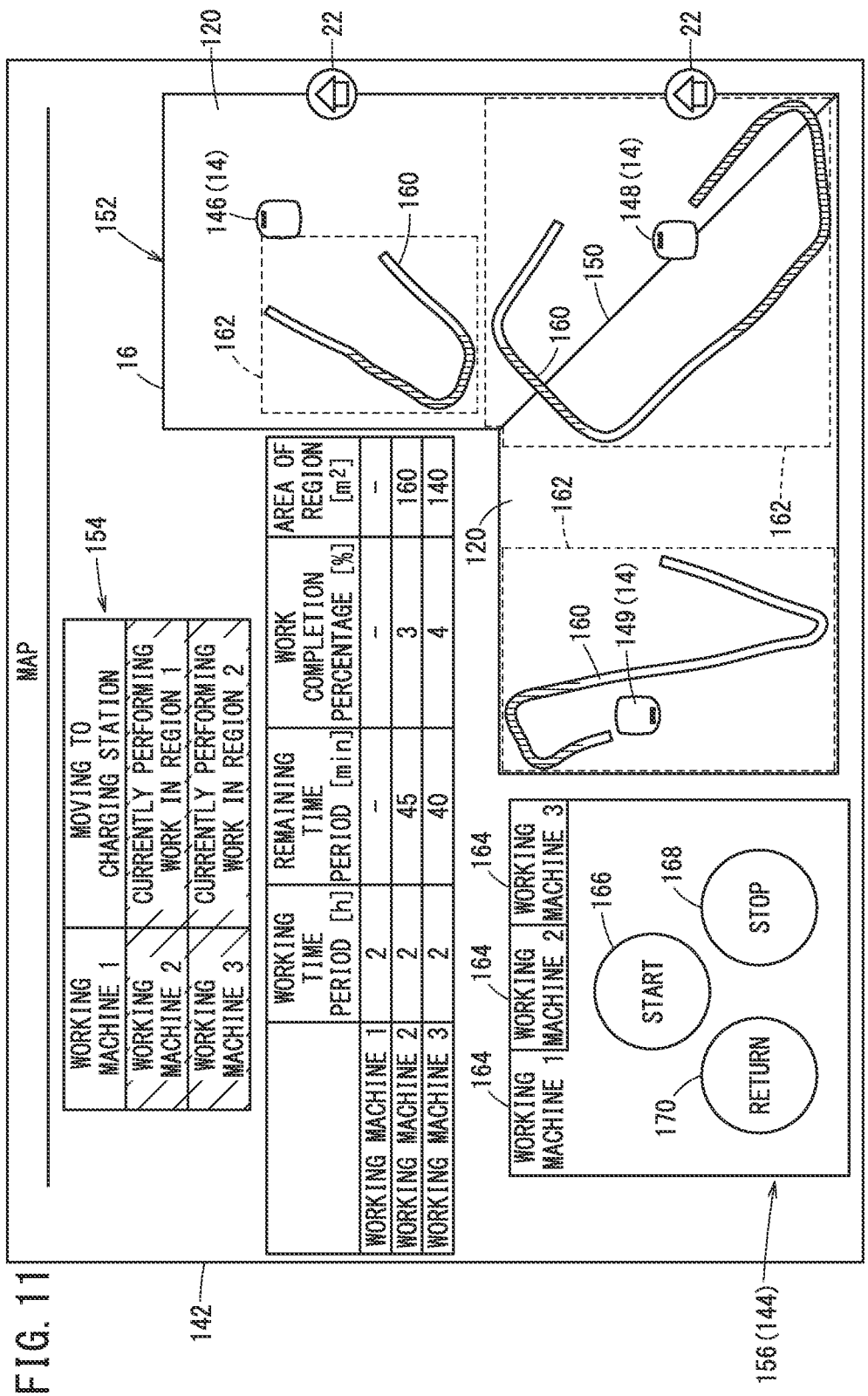
FIG. 11 is a diagram showing the displayed contents of the display unit.

By the first working machine 146 moving toward the charging station 22, the number of the working machines 14 used in performing the work in the working region 16 is reduced from three to two. The determination unit 110 determines that there has been a change in the number of machines. As shown in FIG. 10 and FIG. 11, the working region assigning unit 112 (refer to FIG. 5) resets the assigned working regions 120 in the working region 16 from three regions to two regions. The server 24 transmits information of the assigned working regions 120 that have been reset, to the working machines 14 and the monitors 26. Consequently, the second working machine 148 and the third working machine 149 perform work in the assigned working regions 120 that have been reset. Further, the display unit 142 displays the working region image 152 in which the assigned working regions 120 have been changed to two regions.

Figure 12:
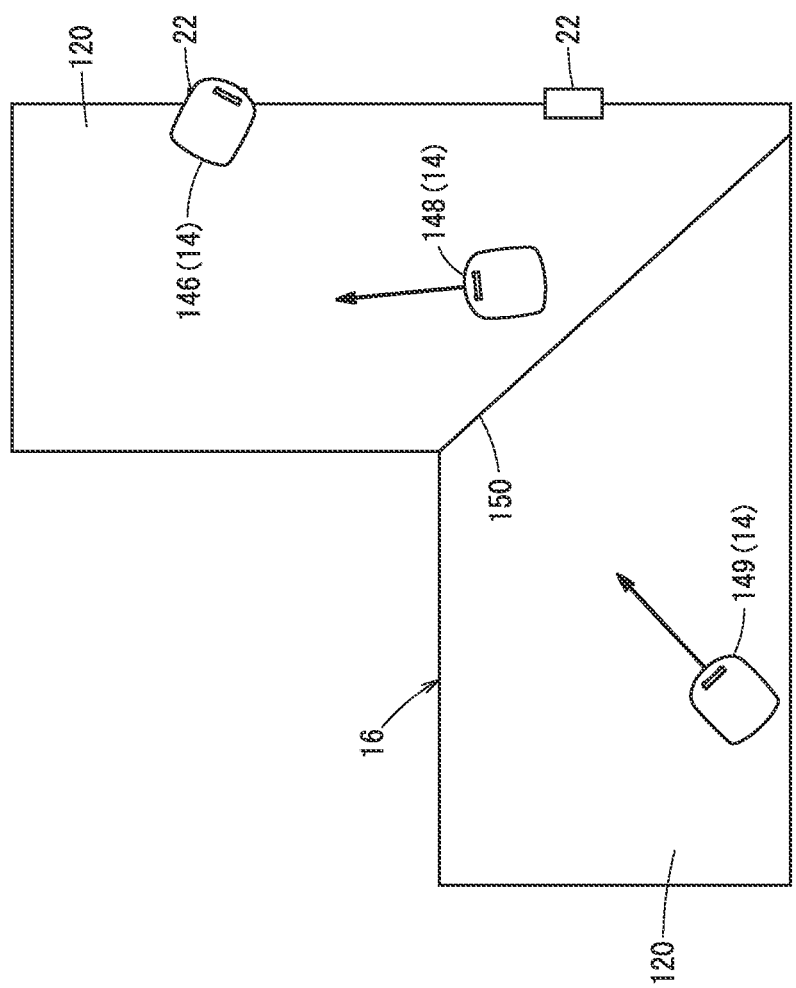
FIG. 12 is a plan view showing the working region.
Figure 13:
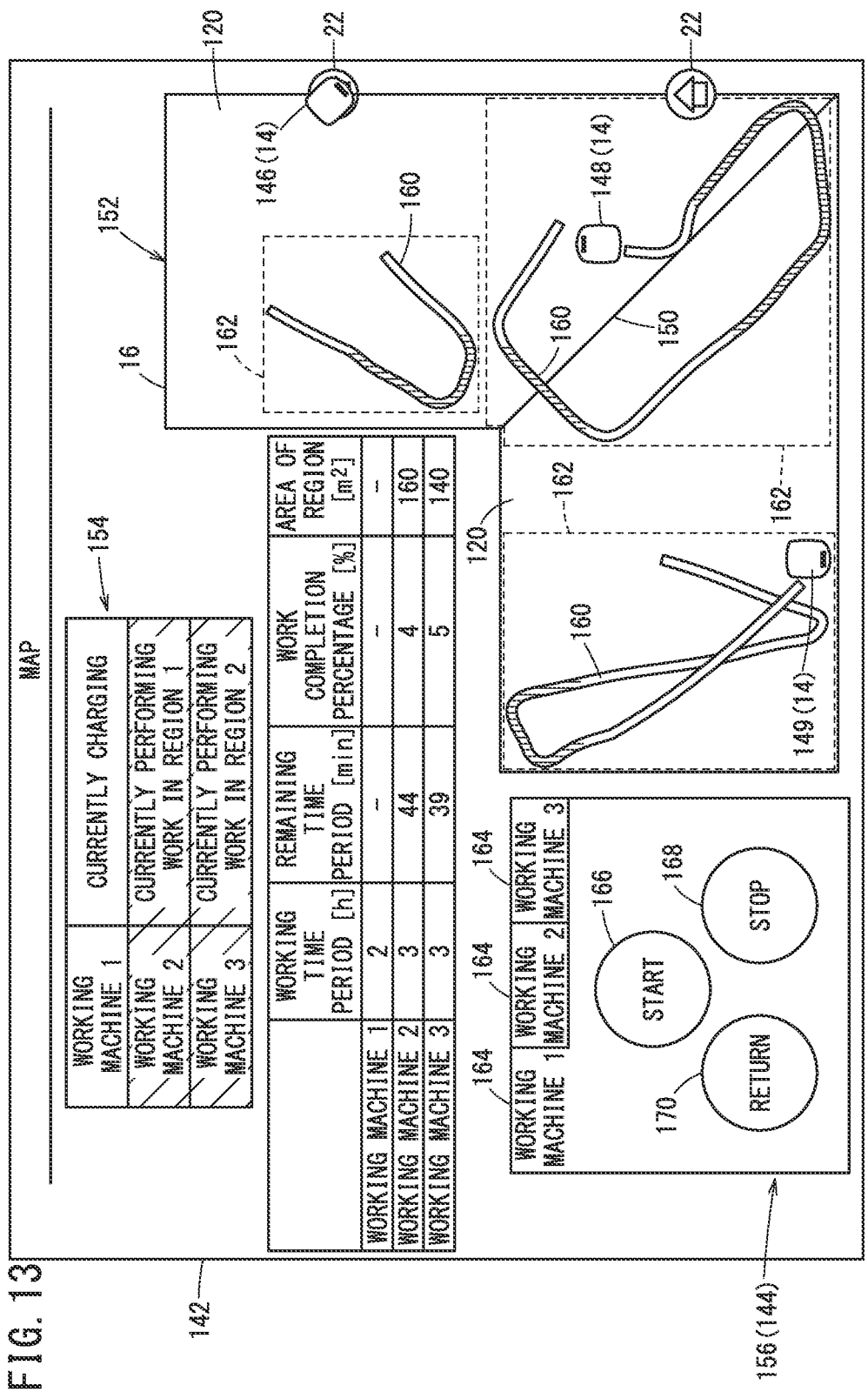
FIG. 13 is a diagram showing the displayed contents of the display unit.

Next, as shown in FIG. 12 and FIG. 13, in the case that the first working machine 146 returns to the charging station 22 and charging is started, information indicating that the first working machine 146 is undergoing charging is transmitted to the server 24 (refer to FIG. 5) from the first working machine 146 or the charging station 22. The server 24 transmits the received information to the monitors 26. Consequently, the display unit 142 displays the working information image 154 indicating that the first working machine 146 is currently undergoing charging. Moreover, since the information concerning the work is transmitted from the second working machine 148 and the third working machine 149 to the monitors 26 via the server 24, the displayed contents of the working region image 152 and the working information image 154 are updated on the display unit 142. More specifically, the respective travel paths 160 and the like of the second working machine 148 and the third working machine 149 are also updated.

Figure 14:
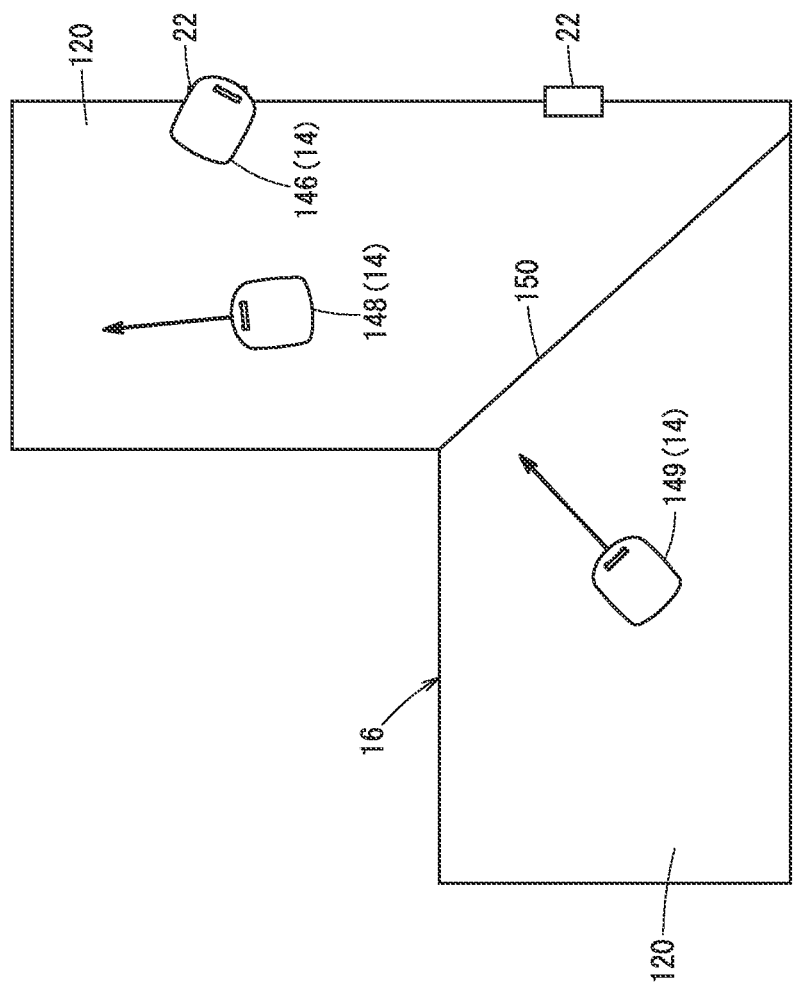
FIG. 14 is a plan view showing the working region.
Figure 15:
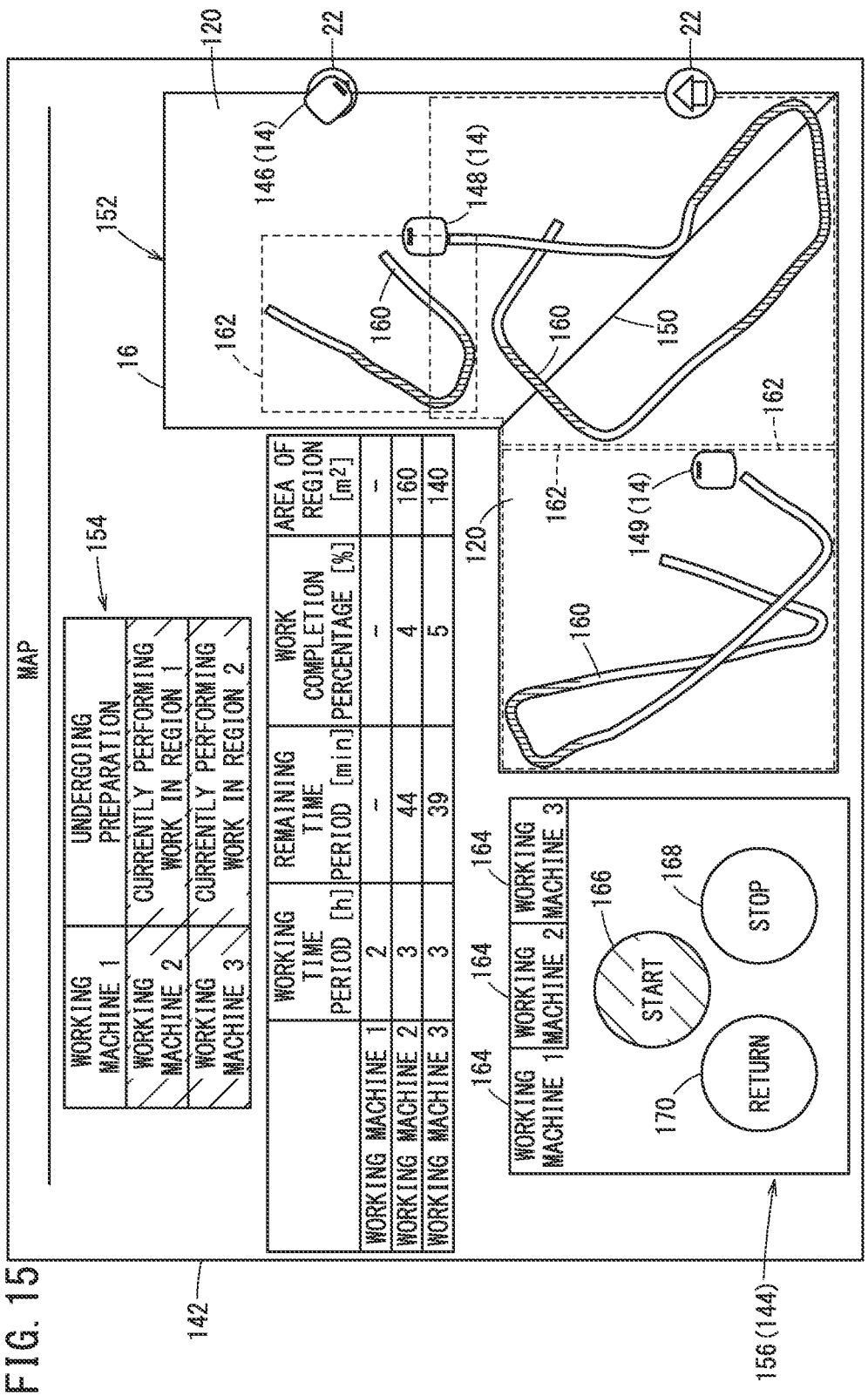
FIG. 15 is a diagram showing the displayed contents of the display unit.

Next, as shown in FIG. 14 and FIG. 15, charging of the first working machine 146 is completed, and the first working machine 146 moves away from the charging station 22. In this case, information indicating that charging of the first working machine 146 is completed and the first working machine 146 is undergoing preparation to perform work is transmitted to the server 24 (refer to FIG. 5) from the first working machine 146 or the charging stations 22. The server 24 transmits the received information to the monitors 26. Consequently, the display unit 142 displays the working information image 154 indicating that the first working machine 146 is currently undergoing preparation to perform work. In this case as well, in the working region image 152 and the working information image 154, the display unit 142 updates the displayed contents of the second working machine 148 and the third working machine 149.

Next, the user decides to restart the work of the first working machine 146. Then, while observing the display unit 142, the user selects the start button 166 corresponding to the first working machine 146. Consequently, the control unit 138 of each of the monitors 26 transmits, to the server 24, a command for causing the first working machine 146 to be operated. The control unit 106 of the server 24 transmits the command received by the communication unit 102 to the first working machine 146. By being operated in response to the command received by the communication terminal 84 (refer to FIG. 4), the first working machine 146 initiates working in its assigned working region 120.

Figure 16:
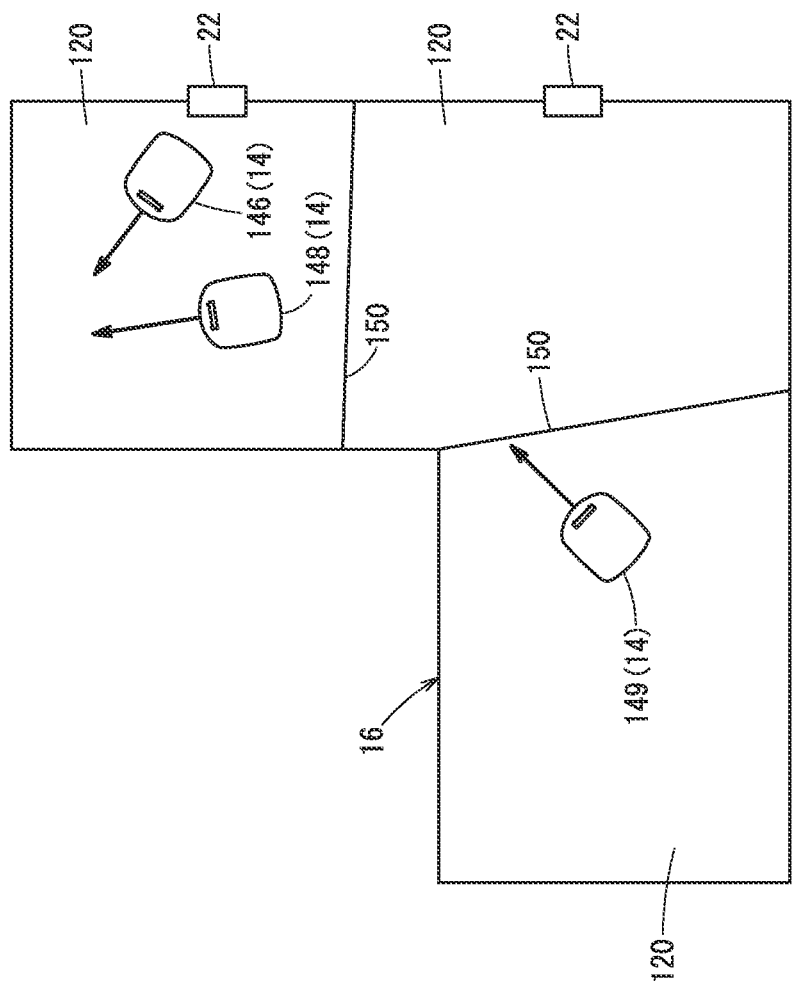
FIG. 16 is a plan view showing the working region.
Figure 17:
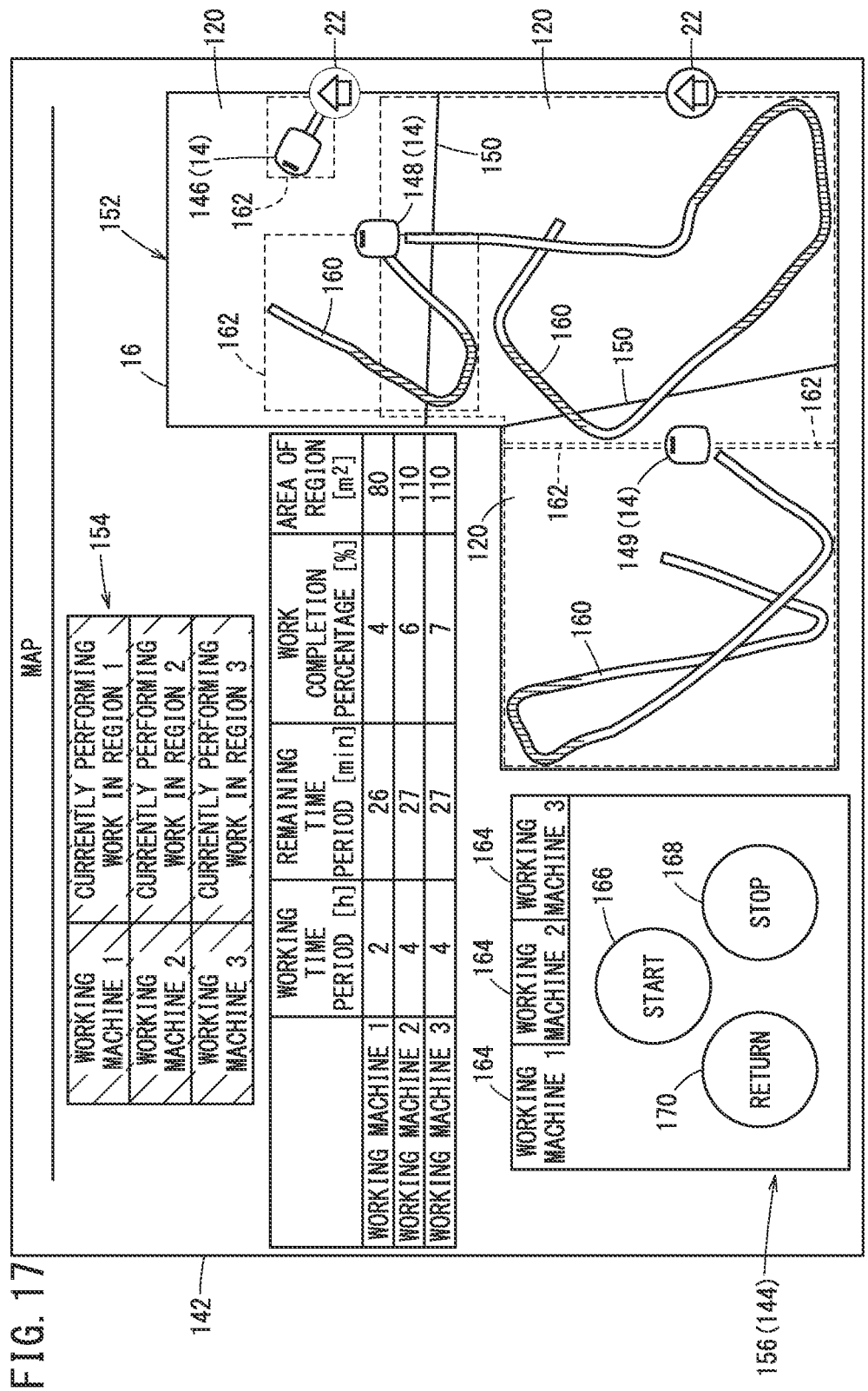
FIG. 17 is a diagram showing the displayed contents of the display unit.

By the first working machine 146 restarting the work, the number of the working machines 14 used in performing the work in the working region 16 is increased from two to three. The determination unit 110 determines that there has been a change in the number of machines. As shown in FIG. 16 and FIG. 17, the working region assigning unit 112 (refer to FIG. 5) resets the assigned working regions 120 in the working region 16 from three regions to two regions. The server 24 transmits information of the assigned working regions 120 that have been reset, to the monitors 26. The display unit 142 displays the working region image 152 indicating that the assigned working regions 120 have been changed to three regions. Further, the display unit 142 displays the working information image 154 indicating that the three working machines 14 are currently performing work.

Figure 18:
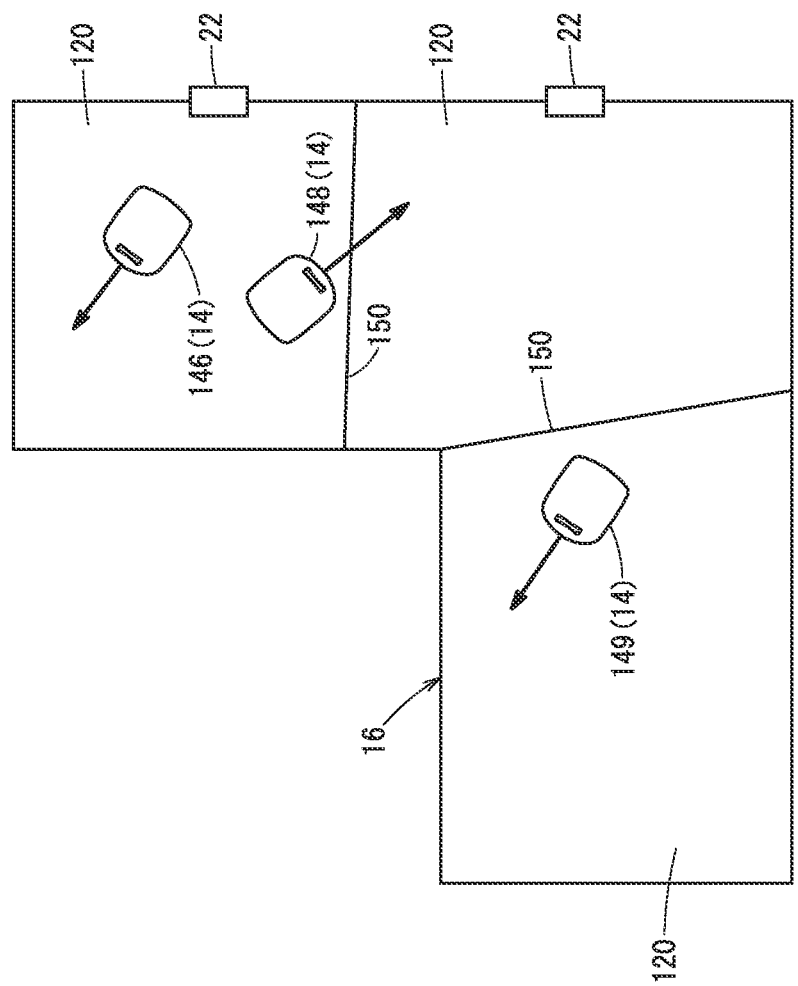
FIG. 18 is a plan view showing the working region.
Figure 19:
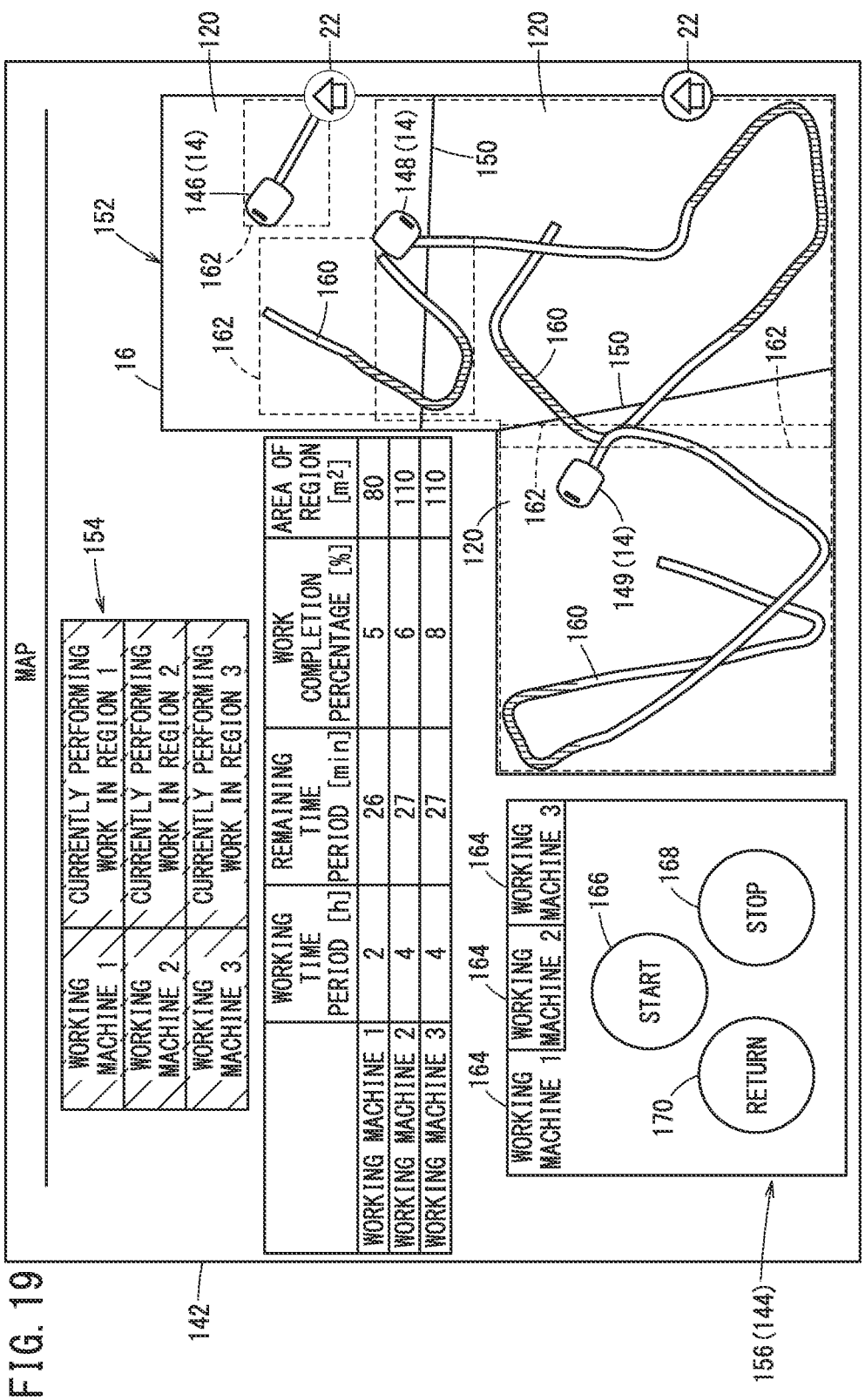
FIG. 19 is a diagram showing the displayed contents of the display unit.

Further, the server 24 also transmits information of the assigned working regions 120 that have been reset, to the working machines 14. Consequently, as shown in FIG. 18 and FIG. 19, the three working machines 14 move to the assigned working regions 120 that have been reset, and perform work in the assigned working regions 120 where they have been moved. The display unit 142 displays the working information image 154 indicating that the three working machines 14 are currently performing work in the assigned working regions 120 that have been reset.

Next, a description will be given with reference to the flow chart of FIG. 20 concerning operations of the work management system 12. Moreover, it should be noted that the subject of the operations in FIG. 20 is the work management device 10 (refer to FIG. 5).

First, in step S1, the information acquisition unit 108 of the work management device 10 acquires the working region information and the machine number information from the memory 104.

In step S2, based on the working region information and the machine number information acquired by the information acquisition unit 108, the working region assigning unit 112 carries out setting of the assigned working regions 120 (refer to FIG. 6) which are assigned to the plurality of working machines 14.

In step S3, in the case that the user operates the operation input unit 144 to instruct the operation of the working machines 14, the control unit 106 transmits commands concerning the assigned working regions 120 and the operation of the working machines 14 from the communication unit 102 to the plurality of working machines 14. Consequently, based on the received commands, the plurality of working machines 14 initiate working in their assigned working regions 120.

In step S4, the determination unit 110 determines whether or not, within the entire working region 16, the portion where the work is completed is greater than or equal to 95%. In the case that the portion where the work is completed is less than 95% (step S4: NO), the server 24 proceeds to step S5. In step S5, the determination unit 110 determines whether or not the number of the working machines 14 used in performing the work has been changed.

In the case that a change in the number of the working machines 14 has not occurred (step S5: NO), the determination unit 110 proceeds to step S6. In step S6, the determination unit 110 determines whether or not a predetermined time period has elapsed. The predetermined time period, for example, may be ten minutes. In accordance with this feature, since it is unnecessary to carry out processing in real time, the processing load on the work management device 10 can be reduced.

In the case that the predetermined time period has elapsed (step S6: YES), the determination unit 110 proceeds to step S7. In step S7, the determination unit 110 determines whether or not a difference of greater than or equal to 10% has occurred in a the work completion percentage among the plurality of assigned working regions 120.

In the case that a difference of greater than or equal to 10% has not occurred (step S7: NO), the determination unit 110 proceeds to step S8. In step S8, the determination unit 110 determines whether or not an assigned working region 120 in which the work has been completed in greater than or equal to 95% of the area exists.

In the case that an assigned working region 120 in which the work has been completed in greater than or equal to 95% of the area does not exist (step S8: NO), the server 24 returns to step S4, and the processes of step S4 to step S8 are executed again. More specifically, in the case that an assigned working region 120 in which the work has been completed in greater than or equal to 95% of the area does not exist, then since a work completed region does not exist, the working machines 14 continue to perform work in the assigned working regions 120.

Further, in the case that the predetermined time period has not elapsed in step S6 (step S6: NO), the server 24 returns to step S4, and the processes of step S4 to step S6 are executed again. This is because, in this case as well, it is necessary to continue performing work in the assigned working regions 120.

Further, in the case that the determination results in steps S5, S7, and S8 are affirmative (steps S5, S7, and S8: YES), the server 24 returns to step S2. In this case, in step S2, since the machine number has been changed, the working region assigning unit 112 resets the assigned working regions 120. Further, since a difference of greater than or equal to 10% has occurred in the work completion percentage among the plurality of assigned working regions 120, the working region assigning unit 112 resets the assigned working regions 120. Furthermore, since an assigned working region 120 in which the work has been completed in greater than or equal to 95% of the area exists, the working region assigning unit 112 resets the assigned working regions 120 by excluding this assigned working region 120. Thereafter, the processes of step S3 and thereafter are executed for the assigned working regions 120 that have been reset.

In step S4, if the portion where the work is completed in the working region 16 is greater than or equal to 95% (step S4: YES), the server 24 proceeds to step S9. In step S9, in the case that the user operates the operation input unit 144 to instruct movement of each of the working machines 14 to a standby position, the control unit 106 transmits commands for the movement from the communication unit 102 to the plurality of working machines 14. Consequently, on the basis of the received commands, the plurality of working machines 14 return to their standby positions.

In the foregoing manner, according to the present embodiment, the assigned working regions 120 are reset using the information concerning the actual work acquired from the working machines 14. Therefore, resetting of the assigned working regions 120 can be carried out with high accuracy. Further, since information of the assigned working regions 120 that have been reset is transmitted from the server 24 to the respective working machines 14 and thereby the working machines 14 is caused to carry out work, it is unnecessary to perform a simulation of the work. Accordingly, the processing load of the work management device 10 can be reduced. However, in the case that the assigned working regions 120 are reset taking into consideration the loads of the working machines 14, simulation of the work may be performed using the assigned working regions 120 that have been reset.

Further, in the present embodiment, since it is possible to display locations where the loads of the working machines 14 were high within the travel paths 160, it becomes possible to reset such locations where the loads were high to new assigned working regions 120. This is because there is a high possibility that the locations where the loads of the working machines 14 were high are locations where the grass remains uncut. In this case, the assigned working regions 120 may be reset by the user selecting the locations where the loads were high in the working region image 152. Alternatively, the working region assigning unit 112 may automatically reset, as the assigned working regions 120, the locations where the loads were high.

The following supplementary notes are further disclosed in relation to the above-described embodiment.

(Supplementary Note 1)

The work management device (10) for managing work performed in the working region (16) using the plurality of autonomous mobile working machines (14, 146, 148, 149) includes the information acquisition unit (108) that acquires the working region information, which is information concerning the working region, and machine number information indicating the number of the autonomous mobile working machines used in performing the work, and the working region assigning unit (112) that carries out setting of the assigned working regions (120) which are assigned to the plurality of autonomous mobile working machines, based on the working region information and the machine number information acquired by the information acquisition unit, wherein the working region assigning unit carries out resetting of the assigned working regions in the case where the number of the autonomous mobile working machines used in performing the work has been changed, or in the case where, among the plurality of assigned working regions, a difference that is greater than or equal to a percentage threshold value has occurred in a work completion percentage, which is a ratio of a portion where the work is completed to each of the assigned working regions.

According to the present invention, in accordance with the working conditions of the plurality of autonomous mobile working machines, resetting of the plurality of assigned working regions is performed. More specifically, in accordance with the working conditions of the plurality of autonomous mobile working machines, a calculation process for optimizing the plurality of assigned working regions is sequentially carried out.

Consequently, the work efficiency is improved, and the work performed in the working region can be completed quickly.

(Supplementary Note 2)

In the work management device described in supplementary note 1, the percentage threshold value may be 10%.

In accordance with this feature, the work efficiency is further improved, and the work performed in the working region can be completed more quickly.

(Supplementary Note 3)

The work management device described in supplementary note 1 or supplementary note 2 may further include the working machine state information acquisition unit (108) that acquires the working machine state information, which is information indicating the states of the autonomous mobile working machines, and the number-of-machines determination unit (110) that determines whether or not the number of the autonomous mobile working machines has been changed, based on the working machine state information acquired by the working machine state information acquisition unit, wherein, in the case that the number-of-machines determination unit determines that the number of the autonomous mobile working machines has been changed, the working region assigning unit may carry out resetting of the assigned working regions.

In accordance with such features, the calculation process for optimizing the plurality of assigned working regions is sequentially performed according to the change in the number of the autonomous mobile working machines. In this case as well, since the work efficiency is improved, the work performed in the working region can be completed quickly.

(Supplementary Note 4)

In the work management device described in supplementary note 3, the working machine state information may include at least one item of information from among information indicating operating states of the autonomous mobile working machines, information indicating remaining capacities of the batteries (44) provided in the autonomous mobile working machines, information indicating errors occurring in the autonomous mobile working machines, information indicating a state of communication between the autonomous mobile working machines and the work management device, and information indicating loads of the working units (56) provided in the autonomous mobile working machines.

In accordance with such features, based on the working machine state information, it is possible to determine whether or not the autonomous mobile working machines are capable of continuing to perform work. For example, in the case that an autonomous mobile working machine does not move for a certain period of time due to the remaining capacity of the battery, or a malfunction or the like in the autonomous mobile working machine, it may be determined that the autonomous mobile working machine is in a state of being incapable of continuing to perform work. In this manner, if there is a possibility that the autonomous mobile working machines may stop operating while performing work, the work can be stopped, and the plurality of assigned working regions can be reset. As a result, it is possible to suppress an adverse influence on the work due to a stop in operation of the autonomous mobile working machines.

(Supplementary Note 5)

The work management device described in any one of supplementary notes 1 to 4 may further include the travel path information acquisition unit (108) that acquires the travel path information indicating the travel paths (160) of the autonomous mobile working machines, and the work completion percentage determination unit (110) that determines whether a difference that is greater than or equal to the percentage threshold value has occurred in the work completion percentage, based on the travel path information acquired by the travel path information acquisition unit, wherein, in the case where the work completion percentage determination unit determines that the difference that is greater than or equal to the percentage threshold value has occurred in the work completion percentage, the working region assigning unit may carry out resetting of the assigned working regions.

In accordance with such features, the actual work completion percentage can be accurately calculated using the travel path information of the autonomous mobile working machines.

(Supplementary Note 6)

In the work management device described in any one of supplementary notes 1 to 5, when carrying out resetting of the assigned working regions, the working region assigning unit may carry out the resetting on the working region excluding a work completed region that is the assigned working region for which the work completion percentage has become greater than or equal to a work completion threshold value.

In accordance with this feature, the work performed in the working region can be completed more quickly.

(Supplementary Note 7)

The work management device described in any one of supplementary notes 1 to 6 may further include the information providing unit (142) that provides the user with at least one item of information from among information indicating the assigned working regions, and working information which is information concerning the work.

In accordance with this feature, it is possible to provide the user with information such as that indicating in which of the assigned working regions the autonomous mobile working machines are positioned. In this manner, by sharing the working information with the user, the user is made capable of performing other work in close proximity to the working region. Further, the user is made capable of remotely monitoring each of the working machines.

(Supplementary Note 8)

In the work management device described in supplementary note 7, the working information may include at least one item of information from among work completion portion information indicating a portion where the work is completed, information indicating loads of the autonomous mobile working machines, and working machine state information indicating states of the autonomous mobile working machines.

In accordance with this feature, it is possible for the user to easily grasp in which of the assigned working regions the autonomous mobile working machines are working, the work completion time of the autonomous mobile working machines, and the like. Consequently, the user is made capable of performing other work in close proximity to the working region.

(Supplementary Note 9)

The work management device described in supplementary note 7 may further include the operation input unit (144) through which an operation input is carried out in order for the user to select at least either the autonomous mobile working machines used in performing the work, or the assigned working regions where the work is to be continued, wherein the working region assigning unit may carry out resetting of the assigned working regions based on the operation input made through the operation input unit.

In accordance with such features, the user can easily change the working region in order to perform other work in close proximity to the working region. Further, the user can add regions in which the user desires to have the autonomous mobile working machines perform work again. Furthermore, the user can exclude an autonomous mobile working machine on which maintenance is to be performed, from the autonomous mobile working machines that perform the work in the working region. Further, the user is made capable of remotely operating each of the working machines.

(Supplementary Note 10)

In the work management device described in any one of supplementary notes 1 to 9, the working region assigning unit may set a plurality of the assigned working regions in a manner so that the areas of the plurality of assigned working regions are equivalent to each other.

In accordance with this feature, it is possible to equalize the work of the plurality of autonomous mobile working machines. As a result, it becomes possible for the plurality of autonomous mobile working machines to complete their work at the same time, and the work in the working region can be performed more efficiently.

(Supplementary Note 11)

The work management method for managing work performed in the working region using the plurality of autonomous mobile working machines includes the information acquisition step (step S1) of acquiring the working region information, which is information concerning the working region, and machine number information indicating the number of the autonomous mobile working machines used in performing the work, the working region assigning step (step S2) of carrying out setting of the assigned working regions which are assigned to the plurality of autonomous mobile working machines, based on the working region information and the machine number information that have been acquired, and the assigned working region resetting step (step S2) of carrying out resetting of the assigned working regions in the case where the number of the autonomous mobile working machines used in performing the work has been changed, or in the case where, among the plurality of assigned working regions, a difference that is greater than or equal to a percentage threshold value has occurred in a work completion percentage, which is a ratio of a portion where the work is completed to each of the assigned working regions.

The present invention is not limited to the disclosure described above, and various configurations can be adopted therein without departing from the essence and gist of the present invention.

What is claimed is:

1. A work management device for managing work performed in a working region using a plurality of autonomous mobile working machines, the work management device comprising:
one or more processors that execute computer-executable instructions stored in a memory,
wherein
the one or more processors execute the computer-executable instructions to cause the work management device to:
acquire working region information, which is information concerning the working region, and machine number information indicating a number of the autonomous mobile working machines used in performing the work;
a carry out setting of assigned working regions which are assigned to the plurality of autonomous mobile working machines, based on the working region information and the machine number information acquired;
cause the plurality of autonomous mobile working machines to perform the work in the assigned working regions; and
carry out resetting of the assigned working regions in a case where, among a plurality of the assigned working regions, a difference that is greater than or equal to a percentage threshold value has occurred in a work completion percentage, which is a ratio of a portion where the work is completed to each of the assigned working regions,
wherein the percentage threshold value is twice a percentage of an area difference between an area of each of the assigned working regions and an area corresponding to a work completion threshold value relative to an area of each of the assigned working regions.

2. The work management device according to claim 1, wherein
the work completion threshold value is 95%; and
the percentage threshold value is 10%.

3. The work management device according to claim 1, wherein the one or more processors cause the work management device to:
acquire working machine state information, which is information indicating states of the autonomous mobile working machines;
determine whether or not the number of the autonomous mobile working machines has been changed, based on the working machine state information acquired; and
carry out resetting of the assigned working regions in a case where it is determined that the number of the autonomous mobile working machines has been changed.

4. The work management device according to claim 3, wherein the working machine state information includes at least one item of information from among information indicating operating states of the autonomous mobile working machines, information indicating remaining capacities of batteries provided in the autonomous mobile working machines, information indicating errors occurring in the autonomous mobile working machines, information indicating a state of communication between the autonomous mobile working machines and the work management device, and information indicating loads of working units provided in the autonomous mobile working machines.

5. The work management device according to claim 1, wherein the one or more processors cause the work management device to:
acquire travel path information indicating travel paths of the autonomous mobile working machines;

determine whether the difference that is greater than or equal to the percentage threshold value has occurred in the work completion percentage, based on the travel path information acquired; and carry out resetting of the assigned working regions in a case where it is determined that the difference that is greater than or equal to the percentage threshold value has occurred in the work completion percentage.

6. The work management device according to claim 1, wherein the one or more processors cause the work management device to, when carrying out resetting of the assigned working regions, carry out the resetting on the working region excluding a work completed region that is the assigned working region for which the work completion percentage has become greater than or equal to the work completion threshold value.

7. The work management device according to claim 1, wherein the one or more processors cause the work management device to provide a user with at least one item of information from among information indicating the assigned working regions, and working information which is information concerning the work.

8. The work management device according to claim 7, wherein the working information includes at least one item of information from among work completion portion information indicating a portion where the work is completed, information indicating loads of the autonomous mobile working machines, and working machine state information indicating states of the autonomous mobile working machines.

9. The work management device according to claim 7, the one or more processors cause the work management device to carry out resetting of the assigned working regions, based on an operation input carried out in order for the user to select at least either the autonomous mobile working machines used in performing the work, or the assigned working regions where the work is to be continued.

10. The work management device according to claim 1, wherein the one or more processors cause the work management device to set a plurality of the assigned working regions in a manner so that areas of the plurality of assigned working regions are equivalent to each other.

11. A work management method for managing work performed in a working region using a plurality of autonomous mobile working machines, the work management method comprising:

an information acquisition step of acquiring working region information, which is information concerning the working region, and machine number information indicating a number of the autonomous mobile working machines used in performing the work;

a working region assigning step of carrying out setting of assigned working regions which are assigned to the plurality of autonomous mobile working machines, based on the working region information and the machine number information that have been acquired;

an assigned working region resetting step of carrying out resetting of the assigned working regions in a case where, among a plurality of the assigned working regions, a difference that is greater than or equal to a percentage threshold value has occurred in a work completion percentage, which is a ratio of a portion where the work is completed to each of the assigned working regions; and a work performing step of causing the plurality of autonomous mobile working machines to perform the work in the assigned working regions, wherein the percentage threshold value is twice a percentage of an area difference between an area of each of the assigned working regions and an area corresponding to a work completion threshold value relative to an area of each of the assigned working regions.

* * * * *